(12) United States Patent
Soncag

(10) Patent No.: US 12,162,537 B2
(45) Date of Patent: Dec. 10, 2024

(54) TAILGATE WITH WORKBENCH STRUCTURE, VEHICLE ASSEMBLY WITH THE SAME, AND METHODS OF MANUFACTURING, INTEGRATING, AND USING THE SAME

(71) Applicant: Rivian IP Holdings, LLC, Plymouth, ME (US)

(72) Inventor: Mustafa Soncag, Inkster, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 120 days.

(21) Appl. No.: 17/956,428

(22) Filed: Sep. 29, 2022

(65) Prior Publication Data

US 2024/0109471 A1    Apr. 4, 2024

(51) Int. Cl.
*B62D 33/03*        (2006.01)
*B60P 3/14*         (2006.01)
(Continued)

(52) U.S. Cl.
CPC .............. *B62D 33/03* (2013.01); *B60P 3/14* (2013.01); *B60R 11/06* (2013.01); *B25B 1/103* (2013.01); *B25B 1/2484* (2013.01)

(58) Field of Classification Search
CPC ...... B60R 11/06; B62D 33/03; B62D 33/0273
(Continued)

(56) References Cited

U.S. PATENT DOCUMENTS 4,509,731 A * 4/1985 Schaal ..................... B25H 1/10
269/283
5,169,202 A * 12/1992 Cupp ................. B62D 33/0273
296/61
(Continued)

FOREIGN PATENT DOCUMENTS

WO    WO-2022212870 A1 * 10/2022

OTHER PUBLICATIONS

"The 2021 Ford F-150 Is Totally New and Really Impressive", Youtube, uploaded by Doug DeMuro, Nov. 24, 2020, https://www.youtube.com/watch?v=sHH0u5v3ZE8 (5 pages).
(Continued)

*Primary Examiner* — Jason S Morrow
(74) *Attorney, Agent, or Firm* — Patterson + Sheridan, LLP

(57) ABSTRACT

Tailgates, tailgates with integrated workbench structures, vehicle assemblies with the same, and methods of manufacturing, integrating, and using the same are disclosed. The tailgates and other pivoting-structures described herein can include one or more integrated workbench structures that are adjustable into different configurations, e.g., at least a first configuration and a second configuration. This allows the workbench structures to support different functions, e.g., holding, supporting, cutting, drilling, sanding, assembling, and/or disassembling objects, among other things. The integrated workbench structures can include support arms, bracing elements, vises, rulers, fasteners, or other adjustable structures that can be operated, modified, or used in different
(Continued)

circumstances. The tailgates and other pivoting-structures described herein can also include elements that provide support in an open position, e.g., in some instances, without the use of cables, arms, or struts.

18 Claims, 14 Drawing Sheets

(51) Int. Cl.
 *B60R 11/06* (2006.01)
 *B25B 1/10* (2006.01)
 *B25B 1/24* (2006.01)
(58) Field of Classification Search
 USPC ........................................................ 296/57.1
 See application file for complete search history.

(56) References Cited

U.S. PATENT DOCUMENTS

| | | | | |
|---|---|---|---|---|
| 5,338,016 A * | 8/1994 | Howard | ................. | B25B 1/103 |
| | | | | 269/208 |
| 5,433,566 A * | 7/1995 | Bradley | ................. | B60P 7/15 |
| | | | | 410/121 |
| 6,802,552 B2 * | 10/2004 | Hunt | ................. | B60J 5/108 |
| | | | | 296/61 |
| 7,862,269 B2 * | 1/2011 | Kovie | ................. | B60P 3/14 |
| | | | | 410/94 |
| 7,874,774 B2 * | 1/2011 | Peterson | ............... | B60P 7/0815 |
| | | | | 410/104 |
| 7,905,532 B2 * | 3/2011 | Johnson | ................. | B62D 33/03 |
| | | | | 296/26.11 |
| 7,976,089 B2 * | 7/2011 | Jones | ................. | B60P 3/40 |
| | | | | 410/121 |
| 9,120,427 B1 * | 9/2015 | Wolski | ................. | B60R 11/06 |
| 9,387,806 B2 * | 7/2016 | Bzoza | ................. | B60R 5/041 |
| 9,862,431 B1 * | 1/2018 | Hemphill | ................. | B62D 33/037 |
| 9,956,924 B2 * | 5/2018 | Nania | ................. | A47J 37/0786 |
| 10,011,308 B2 * | 7/2018 | Hemphill | ................. | B60P 3/14 |
| 10,974,653 B2 | 4/2021 | Scaringe et al. | | |
| 11,046,372 B1 * | 6/2021 | Traugh | ................. | B62D 33/0273 |
| 11,433,952 B2 * | 9/2022 | Smolik | ................. | B60P 3/14 |
| 11,618,369 B2 * | 4/2023 | Murray | ................. | B62D 33/0273 |
| | | | | 296/3 |
| 11,648,992 B2 * | 5/2023 | Cunningham | ..... | B62D 33/0273 |
| | | | | 296/50 |
| 11,667,336 B2 * | 6/2023 | Schalyo | ................. | B62D 35/007 |
| | | | | 296/57.1 |
| 2012/0061899 A1 * | 3/2012 | Trombly | ................. | B25B 11/00 |
| | | | | 269/309 |
| 2012/0325877 A1 * | 12/2012 | Franks | ................. | B60R 11/06 |
| | | | | 224/404 |
| 2017/0136958 A1 * | 5/2017 | Smith | ................. | B60R 11/06 |
| 2020/0062185 A1 | 2/2020 | Scaringe et al. | | |
| 2020/0148283 A1 | 5/2020 | Robinson et al. | | |
| 2021/0039722 A1 * | 2/2021 | Williamson | ............ | B60Q 1/304 |
| 2022/0024525 A1 * | 1/2022 | Staser | ................. | B62D 33/0276 |
| 2022/0410984 A1 * | 12/2022 | Smolik | ................. | B62D 33/0207 |

OTHER PUBLICATIONS

Colin Beresford; "2021 Ford F-150's New Tailgate Is Construction Site Ready", Car and Driver, Jun. 25, 2020, https://www.caranddriver.com/news/a32959088/2021-ford-f-150-tailgate-specs-details/ (7 pages).

* cited by examiner

TAILGATE WITH WORKBENCH STRUCTURE, VEHICLE ASSEMBLY WITH THE SAME, AND METHODS OF MANUFACTURING, INTEGRATING, AND USING THE SAME

INTRODUCTION

Workbenches are structures that can provide a stable surface for objects that are being manipulated, e.g., cut, drilled, sanded, assembled, or otherwise modified. For this reason, workbenches are often used in construction-related projects or hobby-related projects, among other instances. Workbenches are typically supported on the ground during use. Vehicles are sometimes used in connection with construction-related projects or hobby-related projects. However, vehicles lack space, surfaces, and/or features needed to support adaptable and efficient manipulation of certain objects, among other limitations.

SUMMARY

This summary is provided to introduce a selection of concepts in a simplified form that are further described below in the detailed description section of this disclosure. This summary is not intended to identify key features or essential features of the claimed subject matter, nor is it intended to be used as an aid in isolation for determining the scope of the claimed subject matter.

In brief, and at a high-level, this disclosure describes, among other things, tailgates, tailgates having at least one integrated workbench structure, vehicle assemblies with the same, and methods of manufacturing, integrating, and using the same, among other things. In addition, pivoting-structures, e.g., those used in connection with vehicles, having similar configurations are also disclosed.

The tailgates and pivoting-structures discussed herein can include at least one integrated workbench structure that supports a workbench functionality. In addition, the tailgates and other pivoting-structures can also be integrated into different types of vehicles, e.g., passenger cars, trucks, sport utility vehicles ("SUVs"), industrial or commercial vehicles, or other platforms. In accordance with embodiments described herein, the integrated workbench structures can be adjustable into different configurations, e.g., at least a first configuration and a second configuration, to support their workbench functionality. For example, as discussed herein, different workbench structures can be extendable and retractable, expandable and collapsible, attachable and detachable, or otherwise modifiable, operable, or useable to support different workbench functions performed by an associated user.

The workbench structures discussed herein can include, without limitation, support arms, bracing elements, clamps, tracks, vises, fasteners, measuring devices (e.g., rulers, tape measures, electronic measuring devices, and the like), tools (e.g., cutting tools, drilling tools, sanding tools, welding tools, assembly tools, disassembly tools, and/or other types of tools), and other structures suitable for supporting workbench functions. In addition to workbench structures, the tailgates and other pivoting-structures described herein can include features that allow the tailgates and pivoting-structures to be supported in an open position, while limiting, reducing, and/or substantially inhibiting interference with workbench structures. For example, in one embodiment, a tailgate can be supported in an open position without the use of support cables, arms, and/or struts that extend between the tailgate and another structure, e.g., a vehicle body, frame, or cargo box. The features that provide such support can be a pivot-assembly that connects the structures, and/or can be a first tab located on one structure and a second tab located on another structure, the tabs being configured so that the first tab can be pivoted into contact with the second tab to support the tailgate or other pivoting-structure in an open position. In one aspect, the tabs can be configured so that their contact supports at least 300 pounds (~136 kilograms) of downward force on the associated tailgate or pivoting-structure.

The different configurations described herein allow a utility-centric, space-efficient, and multi-functional workspace to be located on a tailgate, gear-tunnel door, and/or other pivoting-structure associate with a vehicle, and in turn, allow such a workspace to be located wherever a vehicle travels. For example, such workspaces can be used at a jobsite or other remote location where there is otherwise limited worksite infrastructure. This, in turn, allows objects to be manipulated with greater ease, flexibility, and adaptability at such locations, among other benefits.

BRIEF DESCRIPTION OF THE DRAWINGS

The tailgates, pivoting-structures, integrated workbench structures, vehicle assemblies with the same, and methods of manufacturing, integrating, and using the same described herein are discussed in detail below with reference to the attached drawing figures, in which.

DETAILED DESCRIPTION

Figure 1:
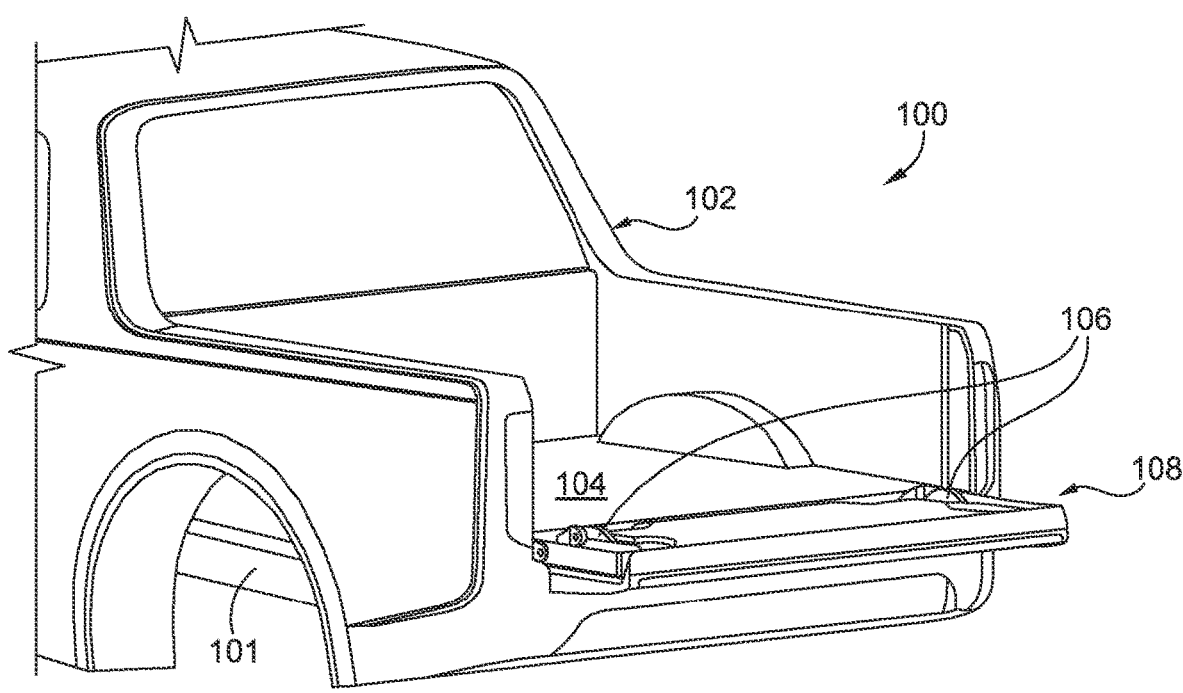
FIG. 1 depicts part of a vehicle with a tailgate in an open position, in accordance with an embodiment of the present disclosure.

This detailed description is provided in order to meet statutory requirements. However, this description is not intended to limit the scope of the invention described herein. Rather, the claimed subject matter may be embodied in different ways, e.g., to include different steps, different combinations of steps, different elements, and/or different combinations of elements, similar to those described in this disclosure, and in conjunction with other present or future technologies and/or techniques. The terms "step" and "block" may be used herein to identify different elements of methods employed, but these terms should not be interpreted as implying any particular order among or between different elements except when such order is explicitly stated.

In general, disclosed herein are tailgates and other pivoting-structures (e.g., gear-tunnel doors) that include at least one integrated workbench structure, vehicle assemblies with the same, and methods of manufacturing, integrating, and using the same, among other things.

In one embodiment, a tailgate is provided that includes at least one workbench structure that is adjustable into different configurations, e.g., at least a first configuration and a second configuration. This adjustability allows the tailgate to be adaptively used for supporting and/or manipulating objects. For example, the integration of one or more workbench structures can allow the tailgate to be used for holding, bracing, cutting, drilling, sanding, measuring, assembling, and/or disassembling objects, among other things, including with greater ease, efficiency, and adaptability. Tailgates, pivoting-structures, and assembles with the same that include such workbench structures are described in detail herein in connection with the accompanying FIGS. 1-15.

The tailgates and other pivoting-structures described herein can be integrated into different vehicles. For example, these vehicles can include passenger vehicles such as cars, trucks, pickup trucks, and SUVs, or can include commercial or industrial vehicles, among other possibilities. In addition, aspects described herein can be implemented into vehicles that are combustion-powered and/or electric-powered, e.g., hybrid-electric vehicles, battery-electric vehicles, plug-in-hybrid-electric vehicles, or other types of electric vehicles or partially electric vehicles. The embodiments described herein can also be integrated with manually, autonomously, and/or semi-autonomously operated vehicles, among other types, as well.

In one embodiment, a tailgate is provided that includes at least one workbench structure. The tailgate can be integrated into a rear area (e.g., one located behind a row of occupant seating) of a vehicle, e.g., adjacent a cargo box or trunk of the vehicle. In one aspect, a tailgate with at least one integrated workbench structure can be attached to an end of a cargo box using a pivot-connection and/or pivot-assembly. In another aspect, a gear-tunnel door (e.g., one that provides lateral access to a storage compartment inside a vehicle) may include at least one integrated workbench structure and may be connected by a similar pivot-connection and/or pivot-assembly.

In additional embodiments, the tailgates and/or other pivoting-structures described herein can include support elements that allow the tailgate and/or other pivoting-structure to be supported in an open position, e.g., while limiting interference with the operation of the integrated workbench structures. In some instances, these support elements can support the tailgate and/or other pivoting-structure in an open position substantially without the use of support cables, arms, and/or struts that extend between the tailgate/pivoting-structure and another structure, e.g., a vehicle body, frame, or cargo box. In different embodiments, the support elements used to support the tailgate and/or other pivoting-structure in an open position can include a first tab or tabs located on the tailgate or pivoting-structure, and a second tab or tabs located on an adjacent structure, e.g., a vehicle body, frame, or cargo box. The configuration of the tabs can be such that the first tab(s) can be pivoted into contact with the second tab(s), such that the contact supports the tailgate or other pivoting-structure in an open, e.g., substantially lowered and fixed, position.

The workbench structures described herein can be at least partially integrated into a tailgate or other pivoting-structure such that the workbench structures are adjustable into different configurations, e.g., at least a first configuration, e.g., one corresponding to a retracted, closed, collapsed, attached, and/or at least partially concealed configuration, and a second configuration, e.g., one corresponding to an extended, expanded, open, detached, and/or exposed configuration, among other possible configurations. In different aspects, the different workbench structures can be support arms, vises, clamps, tracks, fasteners, measuring devices, tools, and/or other structures that can be operated, manipulated, detached, and/or otherwise used to perform different functions, operations, and tasks.

Looking now at FIG. 1, part of a vehicle 100 is shown. The vehicle 100 includes a body 102. The body 102 is supported on a frame 101 (e.g., a chassis rail/assembly). The vehicle 100 also includes a cargo box 104, e.g., one that defines a storage area, e.g., at the rear of the vehicle 100. The cargo box 104 is supported on the frame 101 and/or on the body 102. The vehicle 100 also includes a tailgate 108, e.g., one that is adjustable between a raised position and a lowered position. The tailgate 108 is attached to the cargo box 104 with a pivot-connection 106. The pivot-connection 106 can include different structures that enable and/or limit rotation of the tailgate 108, e.g., within a desired range of motion. For example, the pivot-connection 106 can include one or more hinges or other rotation-enabling mechanisms, can include one or more stop-elements, e.g., structures that limit the pivot-connection 106 from rotating the tailgate 108 past a certain point, and/or may include a locking or securing mechanism, e.g., a latch, tab, or other structure that holds the tailgate 108 in a substantially fixed position, e.g., a raised position or a lowered position, once engaged.

In one embodiment, the pivot-connection 106 is configured to support the tailgate 108 in an open position (e.g., as generally shown in FIG. 1). In addition, the pivot-connection 106 and associated components can be configured to support the tailgate 108 in an open position with reduced, limited, or substantially no use of cables, arms, and/or struts extending between the tailgate 108 and the vehicle 100, frame 101, and/or cargo box 104, e.g., as shown in FIG. 1. Thus, when the tailgate 108 is in the open position (e.g., as generally shown in FIG. 1), a force applied downward on the tailgate 108 can be supported primarily by the pivot-connection 106 and associated structures, instead of by cables, arms, and/or struts extending from the tailgate 108. This can provide substantially increased work-space and working area, and simultaneously, reduce interference with tools or workbench structures being used in connection with the tailgate 108, among other benefits.

To illustrate one example, the pivot-connection 106 can include a tab (e.g., tab 1410 shown in FIGS. 14A and 14B) coupled to the tailgate 108 and a tab (e.g., tab 1412 shown in FIGS. 14A and 14B) coupled to the body 102, frame 101, and/or cargo box 104 of the vehicle 100. The tabs can be formed of a substantially rigid/solid material, e.g., a metal, metal alloy, polymer and/or polymer composite, e.g., such as steel, aluminum, or carbon fiber, having a hardness and/or strength that is/are sufficient to support a particular weight when the tabs are in contact. The hardness and/or strength of the material(s) forming the tabs can be determined using testing methods outlined by the American Society of Testing and Materials ("ASTM"). For example, the tabs can be formed of material(s) having a hardness measured using ASTM E18, e.g., material(s) having a hardness of at least 50 on the Rockwell Hardness Scale ("HRC") in one example instance. The tabs can also be formed of material(s) having a compressive strength measured using ASTM E9 or ASTM D695, e.g., material(s) having a compressive strength of at least 200 Megapascals ("MPa") in one example instance. The tabs can also be formed of material(s) having a tensile strength that is measured using ASTM E8 or ASTM D638, e.g., material(s) having a tensile strength of at least 300 MPa in one example instance. In one aspect, the pivot-connection 106 and associated tabs with their material properties and construction can be configured so that the tabs in contact can support at least three hundred pounds (~136 kilograms) of downward force on the tailgate 108 when the tailgate 108 is in the open position (e.g., as generally shown in FIG. 1).

Figure 2:
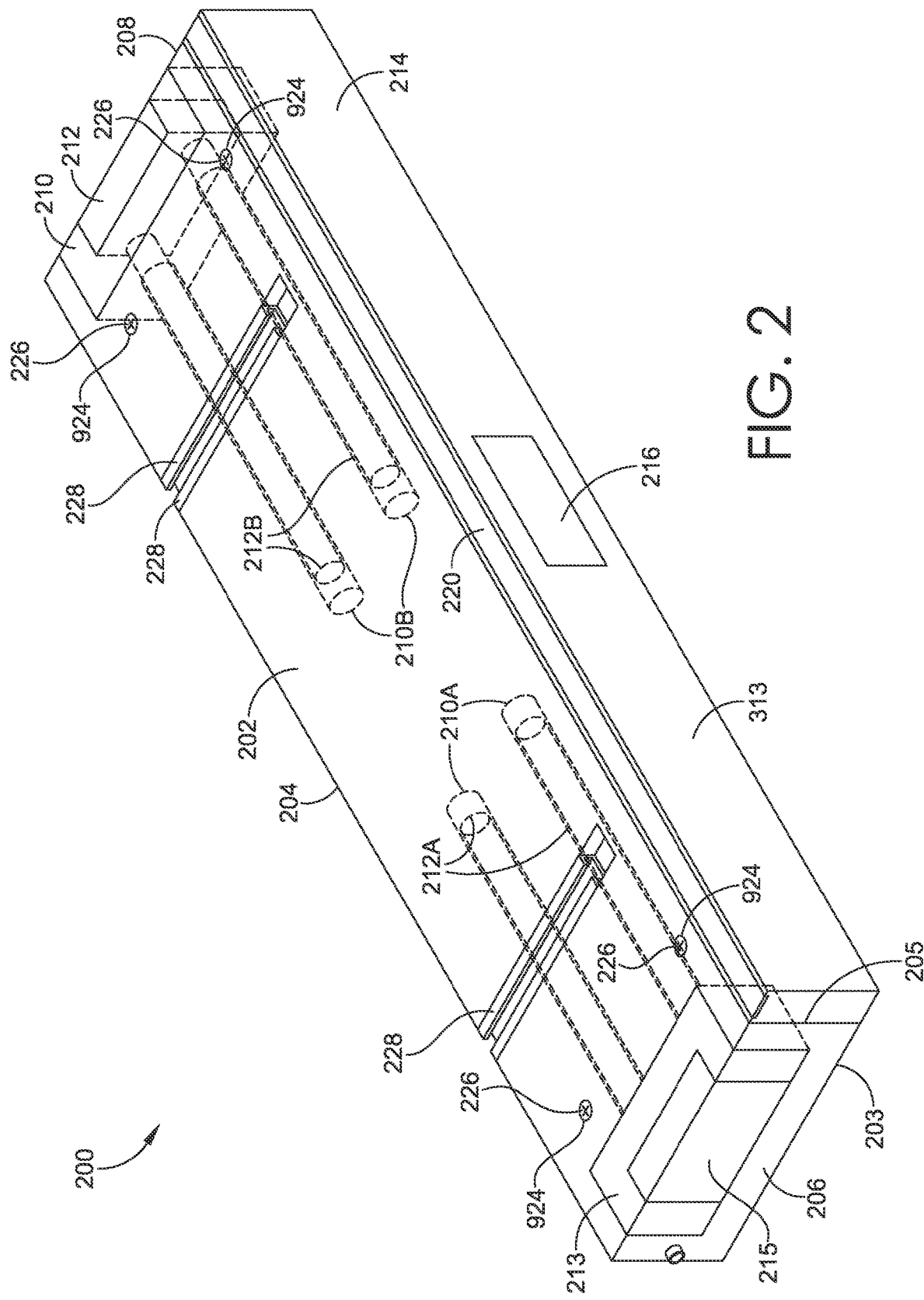
FIG. 2 depicts a tailgate with a selection of integrated workbench structures, in accordance with an embodiment of the present disclosure.
Figure 3:
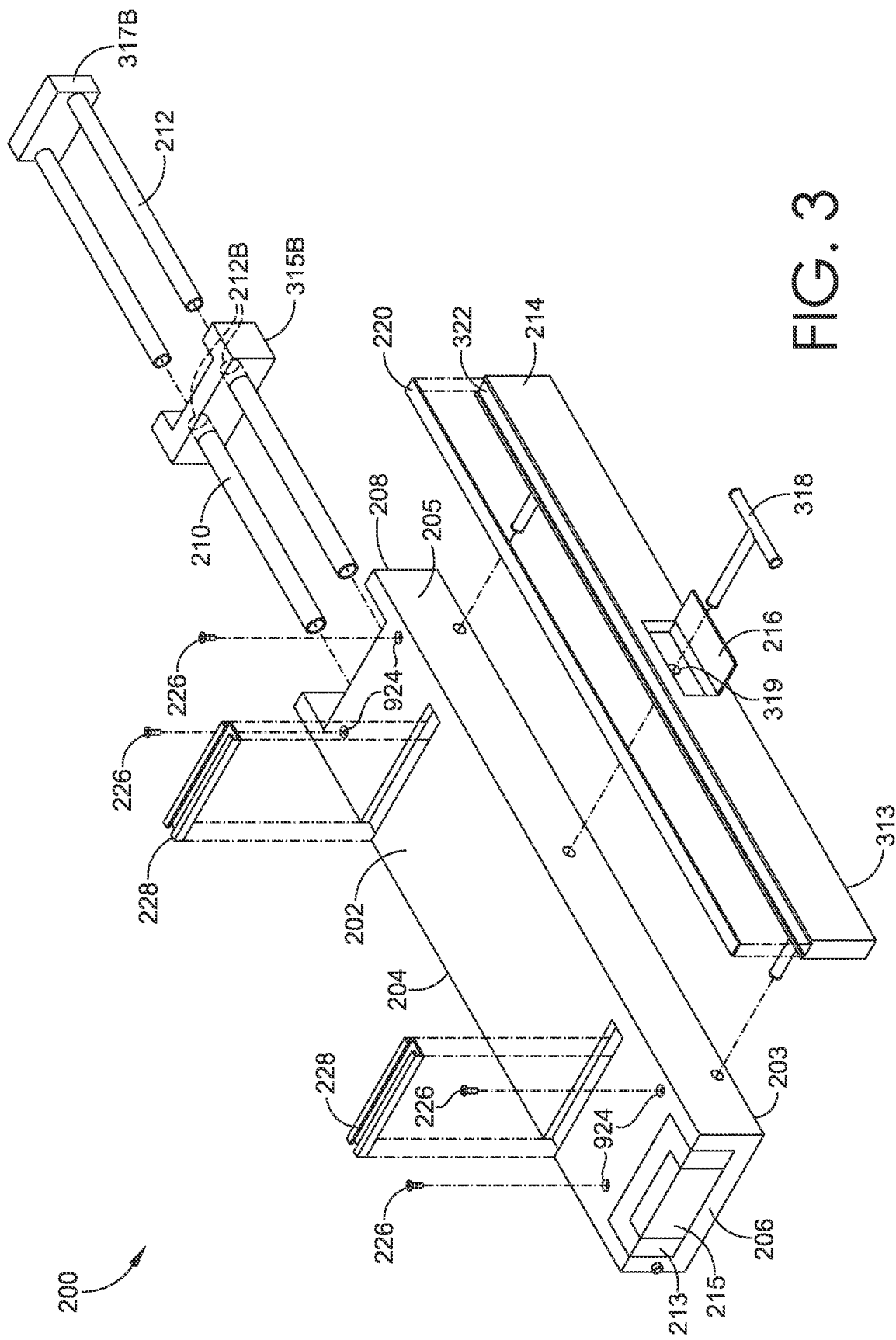
FIG. 3 depicts the tailgate of FIG. 2 in partially exploded form, in accordance with an embodiment of the present disclosure.

Looking now at FIGS. 2 and 3, a tailgate 200 having a non-limiting selection of integrated workbench structures 210, 212, 213, 214, 215, 216, 318, 220, 226, 228 is shown, in accordance with an embodiment of the present disclosure. The tailgate 200 is shown generally assembled in FIG. 2 and generally exploded in FIG. 3. It can be seen with the tailgate 200 that the different workbench structures 210, 212, 213, 214, 215, 216, 318, 220, 226, 228 that are integrated can be fixed, adjustable, or removable, e.g., in one instance being adjustable between at least one configuration and another configuration, to support different workbench functionalities. The different workbench structures 210, 212, 213, 214, 215, 216, 318, 220, 226, 228 are described in detail below.

Looking at FIGS. 2 and 3, the tailgate 200 includes a surface 202, an opposite-facing surface 203, a base 204, a distal end 205, an end 206, and an end 208. The base 204 of the tailgate 200 can be mounted to a vehicle at a pivot-connection, e.g., such as the pivot-connection 106 shown in FIG. 1, allowing it to be used with the vehicle (e.g., the vehicle 100 shown in FIG. 1). The pivot-connection can also include the tabs described in connection with FIG. 1 and FIGS. 14A and 14B. The tabs can allow the tailgate 200 to be supported in an open position with limited, reduced, or substantially no need for cables, arms, and/or struts to be attached between the surface 202 and/or ends 206, 208 of the tailgate 200 and the adjacent structure. The tailgate 200 can be formed from material(s) with a rigidity and/or strength as described in connection with the tabs discussed above with respect to FIG. 1. For example, the tailgate 200 can be formed from any one or a combination of metal, metal alloy, polymers, polymer composites, natural materials such as wood, textiles, or fibers, and/or other materials having characteristics that support the use, operation, and functionality of the tailgate 200.

The example selection of workbench structures integrated with the tailgate 200 includes support arms 210, 212 located at the end 208 and support arms 213, 215 located at the end 206; a vise 214 located at the distal end 205; a cover 216 located on the vise 214; a pivot-lever 318 located adjacent to the distal end 205 and extending through the vise 214; a ruler 220 located adjacent to the distal end 205; a plurality of mounting fasteners 226 located on the surface 202, and a pair of recessed tracks, e.g., formed as T-tracks, 228. This selection of workbench structures 210, 212, 213, 214, 215, 216, 318, 220, 226, 228 integrated with the tailgate 200 in FIGS. 2 and 3 is provided as a non-limiting example. Thus, any one, or combination, of such workbench structures 210, 212, 213, 214, 215, 216, 318, 220, 226, 228 can be used with the different tailgates and pivoting-structures described herein, among other possible workbench structures.

Looking more specifically at FIG. 3, the tailgate 200 of FIG. 2 is shown in partially exploded form, generally depicting the plurality of workbench structures 210, 212, 213, 214, 215, 216, 318, 220, 226, 228 that are integrated into the tailgate 200. In FIG. 3, one workbench structure that is shown is a pair of support arms 210, 212 located at the end 208 of the tailgate 200 (a similar pair of support arms 213, 215 is located at the end 206 of the tailgate 200 in this non-limiting example). The support arms 210, 212 are integrated, e.g., slidably mounted, at least partially inside the tailgate 200. In particular, the support arm 210 is positioned in a recess 210B shown in FIG. 2. FIG. 2 generally depicts the support arm 210 in a retracted position. The support arm 210 is positioned in the recess 210B such that the support arm 210 can extend and retract in the recess 210B, the extended position being generally shown in FIG. 3. The tailgate 200 also includes an additional support arm 212 mounted generally within the support arm 210. In particular, the support arm 212 is positioned in a recess 212B shown in FIG. 2. In different aspects, the support arms 210, 212 can include gripping portions 315B, 317B with geometries that facilitate manually extending the support arms 210, 212 from the tailgate 200. In different embodiments, the length of the support arms 210, 212 can be shorter than half of the length of the tailgate 200 measured between the ends 206, 208. This configuration can facilitate the integration of support arms on both ends 206, 208 of the tailgate 200, e.g., as shown in the non-limiting example of FIGS. 2 and 3.

The support arms 210, 212 can be adjusted between different configurations, e.g., a retracted position as generally shown in FIG. 2, and an extended position as generally shown in FIG. 3. Looking at FIG. 3, the support arm 210 is shown generally extended, and the support arm 212 is shown generally extended from the support arm 210. To enable this separate extension, the support arm 212 is positioned in a recess 212B formed in the support arm 210, such that the support arm 212 can extend and retract in the recess 212B of the support arm 210. In other words, the support arms 210, 212 can be linearly extended/retracted, e.g., telescoped into and out of, the recesses 210B, 212B, thereby allowing for aligned extension and retraction along a common axis. In addition, this multi-component configuration allows for a greater length of supporting structure to be provided despite there being a limited width across the tailgate 200 for enclosing extendable structures in the retracted configuration. In the example of FIG. 3, the tailgate 200 includes a similar support arm assembly located at the end 206 of the tailgate 200 which may have a pair of extendable support arms arranged in a similar configuration as the support arms 210, 212.

FIGS. 2 and 3 depict a pair of extendable and retractable support arms 210, 212 being positioned at each end 206, 208 of the tailgate 200. However, in different embodiments, a single extendable support arm may instead be located at an end 206 or an end 208 of the tailgate 200, or more than two extendable support arms, e.g., in similar telescoping configurations, may be located at an end 206 and/or an end 208 of the tailgate 200. In additional embodiments, the support arms 210, 212 can include locking or securing features (e.g., a latch, lock, or other securing mechanism) that allow them to remain substantially fixed in the extended and/or retracted position.

Looking still at FIGS. 2 and 3, an additional workbench structure in the form of a vise 214 is shown, in accordance with an embodiment of the present disclosure. The vise 214 is coupled to the tailgate 200 at a location generally opposite from the base 204 and such that it extends generally between the ends 206, 208 of the tailgate 200. In FIG. 2, the vise 214 is depicted in a generally closed configuration, and in FIG. 3, the vise 214 is depicted in a generally open or expanded configuration. The vise 214 can be adjusted between the closed configuration and the open configuration and thus can be used to cinch, brace, or compress objects, thereby holding them in position for substantially stable manipulation.

To facilitate opening and closing the vise 214, the vise 214 includes a clamping-element 313 that is controlled by a pivot-lever 318. The pivot-lever 318 can be rotated to adjust a position of the clamping-element 313 relative to the distal end 205 of the tailgate 200. This relative positioning of the clamping-element 313 and the distal end 205 of the tailgate 200 defines the gap in the vise 214 where an object (e.g., a work piece) can be secured for manipulation. The clamping-element 313 (e.g., forming one side of the vise 214) may be formed of metal, metal alloy, polymers, composites, wood, and/or another material, or any combination thereof, and the distal end 205 of the tailgate 200 can be formed from similar materials. In some embodiments, the surfaces of the clamping-element 313 can include teeth, a roughened texture, and/or can include a material that provides a higher degree of friction than other materials used to form the tailgate 200, e.g., for increased grip and stability with work pieces (the degree of friction can be determined using any suitable test, e.g., such as ASTM D1894). Or, the surfaces of the clamping-element 313 can include softer materials suitable for handling more easily-damaged materials, e.g., such as glass, stone, or metal, e.g., the surfaces can include rubbers, polymers, or textiles with such characteristics.

The vise 214 can be used to secure objects of a different thickness or width by adjusting the vise 214 from the open configuration to the closed configuration using the pivot-lever 318. In one embodiment, e.g., an example being shown in FIG. 3, the pivot-lever 318 can extend through an opening 319 in the clamping-element 313 and into contact with the tailgate 200 (e.g., attaching to a threaded connection and/or cylinder). In this configuration, the pivot-lever 318 can also be extendable and retractable through the opening 319. The rotation of the pivot-lever 318 is also discussed below with respect to FIGS. 7-8. The opening 319 in the clamping-element 313 that the pivot-lever 318 extends through may include a cover 216 (e.g., a lid) that is adjustable between an open configuration (e.g., as generally shown in FIG. 3) and a closed configuration (e.g., as generally shown in FIG. 2). The cover 216 in its closed position may substantially cover or enclose the pivot-lever 318 when the pivot-lever 318 is in the retracted position generally within the tailgate 200. Upon opening the cover 216, the pivot-lever 318 may be extended (e.g., pulled outward) from its recess, and then rotated to adjust the spacing of the vise 214. Once extended, the pivot-lever 318 may be rotated in a direction (e.g., clockwise) to increase the distance between the clamping-element 313 and the distal end 205 of the tailgate 200. This allows an object (e.g., object 832 in FIG. 8) to be positioned in the vise 214 adjacent to the tailgate 200. The pivot-lever 318 may then be rotated in another direction (e.g., counter-clockwise) to decrease the distance between the clamping-element 313 and the distal end 205 of the tailgate 200 to tighten the clamping-element 313 and thereby secure the object in the vise 214.

Looking still at FIGS. 2 and 3, another workbench structure is shown, in accordance with an embodiment of the present disclosure. In particular, the tailgate 200 includes a ruler 220 that is positioned in a recess 322 shaped to hold the ruler 220. The recess 322 is positioned so that the ruler 220 extends generally between the ends 206, 208 of the tailgate 200. In different embodiments, the recess 322 can be located anywhere on the tailgate 200. For example, the recess 322 can be located on the surface 202 of the tailgate 200 instead of on the vise 214. In some embodiments, if a metal ruler 220 is used, the recess 322 can include magnets for releasably securing the ruler 220 in the recess 322. In addition, other types of securing elements can be used, e.g., a strap, cover, clip, bracket, or other similar feature.

The recess 322 and the corresponding ruler 220 shown in FIGS. 2 and 3 extend generally from the end 206 of the tailgate 200 to the end 208 of the tailgate 200. In some embodiments, the recess 322 can be shorter in length than the length measured from the end 206 of the tailgate 200 to the end 208 of the tailgate 200. In different embodiments, the ruler 220 can display metric units and/or standard (imperial) units. The ruler 220 may be metal, plastic, or another material. In some embodiments, the ruler 220 can have metric units in one area and standard (imperial) units in another area. In additional embodiments, another tool may be stored in the recess 322. For example, in place of the ruler 220, a leveling tool may be stored, among other possible tools.

Looking still at FIGS. 2 and 3, another workbench structure is shown, in accordance with an embodiment of the present disclosure. In particular, the tailgate 200 includes a plurality of mounting holes 924 in the surface 202. In addition, a plurality of mounting fasteners 226 are provided. The plurality of mounting fasteners 226 can be positioned in the plurality of mounting holes 924 and can be adjusted to different depths therein, e.g., through being depressed or through being threaded inward/outward. In one instance, the plurality of mounting holes 924 can be countersink mounting holes. In the example shown in FIG. 3, some of the mounting holes 924 are positioned adjacent to the end 206 of the tailgate 200, and some of the mounting holes 924 are positioned adjacent to the end 208 of the tailgate 200. In addition, in some embodiments the mounting holes 924 and corresponding mounting fasteners 226 can be positioned proximate a central area of the surface 202 of the tailgate 200. In different embodiment, the plurality of mounting fasteners 226 can be machine screws, a sheet metal screws, a wood screws, or cap screws, or can simply be plugs that use a friction-fit. The plurality of mounting fasteners 226 can have fastener heads that are adjustable to a point of contact with the surface 202, or to a point of being countersunk in the surface 202, in different aspects. The mounting fasteners 226 and mounting holes 924 can be used to secure an elongated material piece to the tailgate 200. For example, the mounting fasteners 226 can be extended through corresponding holes in a board or sheet (e.g., one formed of plywood, particle-board, medium density fiberboard ("MDF"), or sheet metal) and then can be threaded into the mounting holes 924 to thereby secure a "sacrificial board" to the tailgate 200. This sacrificial board can be used to protect the surface 202 of the tailgate 200 when objects are being placed on the tailgate 200 or otherwise are being manipulated on the tailgate 200.

Looking still at FIGS. 2 and 3, another workbench structure is shown, in accordance with an embodiment of the present disclosure. In particular, the tailgate 200 includes the recessed tracks, e.g., T-tracks 228, located on the surface 202 of the tailgate 200. The T-tracks 228 can be used to at least partially secure or mount a clamp (e.g., such as clamps 630 of FIG. 6), such that the clamps are configured to engage and adjustably slide along the corresponding T-tracks 228. The T-track 228 may be used to secure an object against the tailgate 200 for subsequent handling and manipulation (e.g., cutting, drilling, sanding, or the like). The T-tracks 228 may be used in conjunction with the plurality of mounting holes 924 and with the plurality of mounting fasteners 226 to secure objects. In different embodiments, a single T-track 228 may be included on the tailgate 200, or at least two, three, four, five, or at least six T-tracks 228 may be included on the tailgate 200.

In some embodiments, the T-tracks 228 may be secured to the tailgate 200. For example, the T-tracks 228 can be positioned in corresponding recesses in the tailgate 200 such that one or more fasteners (e.g., screws, bolts, rivets, or the like) can then be inserted through holes in the T-tracks 228 and then through corresponding holes in the recesses to secure the T-tracks 228 in place on the tailgate 200. In one embodiment, to provide a substantially flush surface profile, the depth of the recess for each T-track 228 may be substantially similar to a height of the T-track 228, e.g., generally as shown in FIG. 3. In this sense, the T-tracks 228 may be embedded in a channel or slot formed in the tailgate 200, being exposed at the surface 202, the base 204, and/or the distal end 205.

Figure 4:
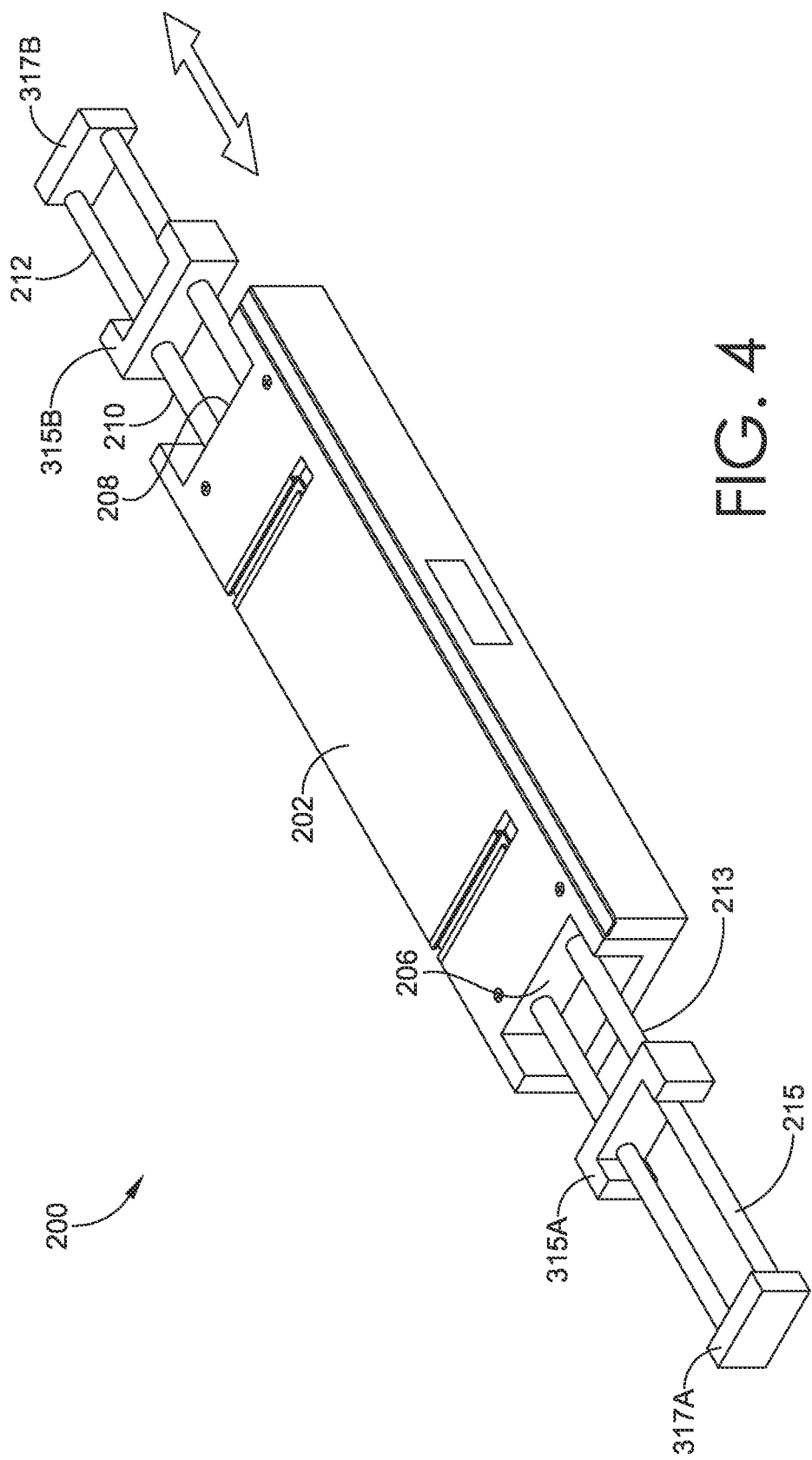
FIG. 4 depicts the tailgate of FIGS. 2-3 in assembled form, and with some of the workbench structures adjusted into an extended configuration, in accordance with an embodiment of the present disclosure.

Looking now at FIG. 4, the tailgate 200 of FIGS. 2 and 3 is again shown. FIG. 4 shows the tailgate 200 with support arms 210, 212 and support arms 213, 215 in a substantially extended configuration. For example, the support arms 210, 212 are extended from the end 208 of the tailgate 200, and the support arms 213, 215 are extended from the other end 206 of the tailgate 200. The support arms 210, 213 may each be slidably mounted in corresponding recesses in the tailgate 200 (e.g., as depicted and described in connection with FIG. 2), such that the support arms 210, 213 are adjustable between a retracted position and an extended position through movement within the recesses. The support arms 212, 215 may each be slidably mounted in recesses located within the corresponding support arms 210, 213, such that the support arms 212, 215 are adjustable between a retracted position and an extended position within those recesses. Further, the support arms 210, 212, 213, 215 have corresponding gripping portions 315A, 315B, 317A, 317B useable for manually extending and retracting the support arms 210, 212, 213, 215.

In different embodiments, similar but different structural configurations may be used. For example, in additional aspects, additional support arms may be used, e.g., such as third support arms that are extendable/retractable in recesses formed in the support arms 212, 215. The support arms 210, 212, 213, 215 may include stop-elements or interference structures that substantially limit, restrict, or prevent the removal of the support arms 210, 212, 213, 215 from their corresponding recesses in the tailgate 200, and/or the support arms 210, 212, 213, 215 may have frictional engagement with the sidewalls of their corresponding recesses to limit movement of the support arms 210, 212, 213, 215 during use. The support arms 210, 212, 213, 215 may also be securable in certain positions using any of the securing elements described herein.

Figure 5:
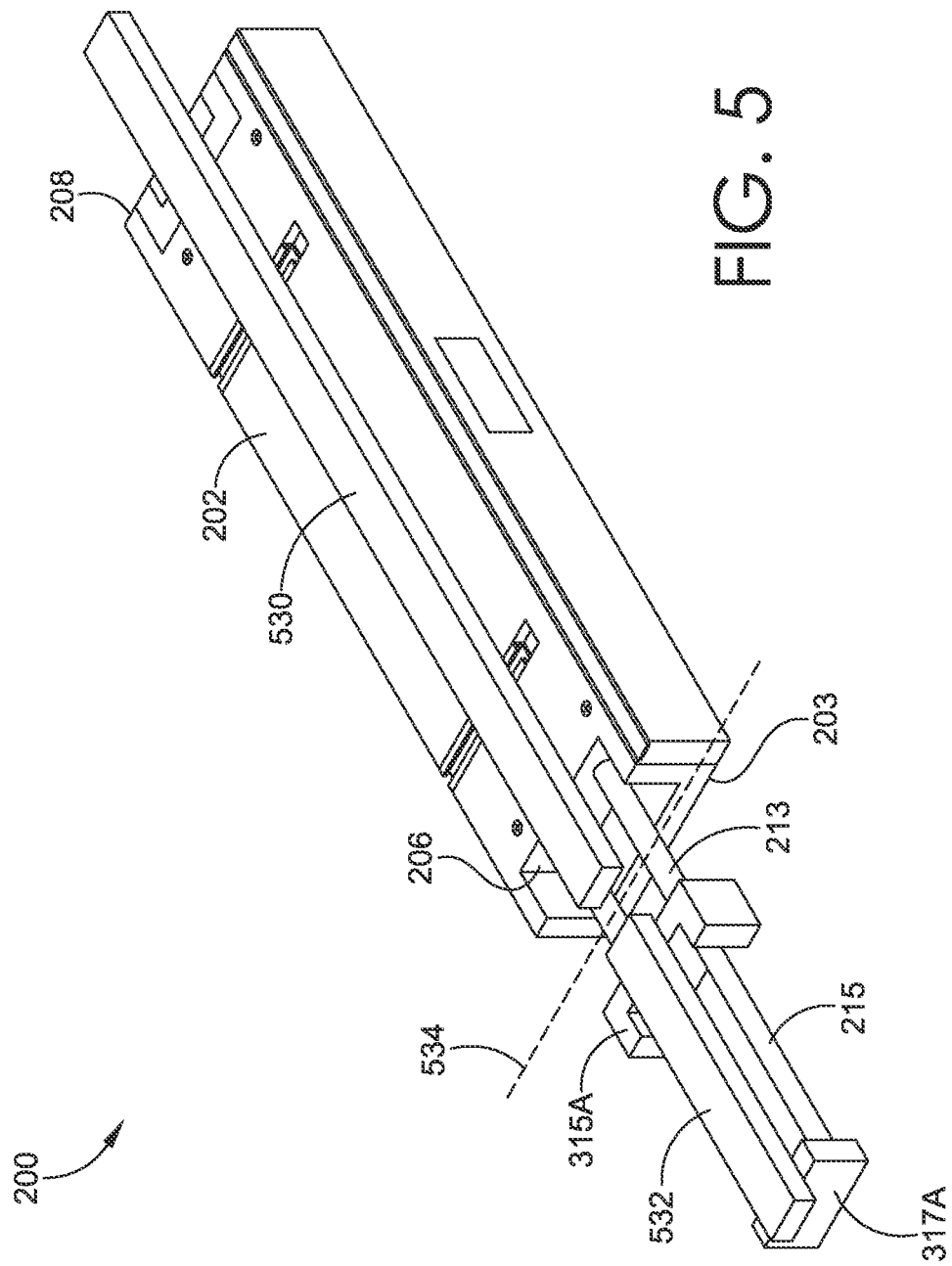
FIG. 5 again depicts the tailgate of FIGS. 2-3 with an integrated workbench structure, e.g., a pair of support arms being used to support an object, in accordance with an embodiment of the present disclosure.

Looking now at FIG. 5, the tailgate 200 of FIGS. 2 and 3 is again shown, in accordance with an embodiment of the present disclosure. In particular, the tailgate 200 is shown with the support arms 213, 215 extended and with the tailgate 200 supporting a work piece 530. In addition, at the end 206 of the tailgate 200, the support arm 213 is extended from a corresponding recess (e.g., recess 210A in FIG. 2) in the tailgate 200 and the support arm 215 is extended from a corresponding recess (e.g., recess 212A in FIG. 2) in the support arm 213. In some embodiments, the recess(es) in the support arms 210, 213 may be two cylindrically shaped openings/channels extending through the support arms 210, 213. In other embodiments, the support arms 210, 213 my each include one opening/channel extending through the support arms 210, 213 for a corresponding single extension. In yet another embodiment, the support arms 210, 213 can have more than two openings/channels for supporting corresponding numbers of extensions, e.g., to provide even greater stability.

The cylindrically-shaped extensions shown in FIG. 5 may be made of metal, metal alloy, composites, polymers, or other rigid materials, e.g., with construction that can support at least 300 pounds (~136 kilograms). The diameter of the cylindrically-shaped extensions of the support arms 212, 215 is smaller than the diameter of the cylindrically-shaped extensions of the support arm 210, 213, such that the cylindrically-shaped extensions of the support arms 212, 215 can fit within the cylindrically-shaped extensions of the support arms 210, 213 when the support arms 212, 215 are in a retracted position. The support arms 213, 215 include gripping portions 315A, 317A that facilitate manually extending and retracting the structures. In addition, the gripping portion 317A of the support arm 215 may be smaller than the gripping portion 315A of the support arm 213, such that the gripping portion 317A of the support arm 215 fits into a recess or indentation in the gripping portion 315A of the support arm 213 when the support arm 215 is in a retracted position (e.g., as shown in FIG. 2).

Looking at FIG. 5, the tailgate 200 is shown supporting a work piece 530. The work piece 530 may be longer than the length of the tailgate 200 measured from the end 206 to the other end 208. To accommodate this, the support arms 210, 212, 213, 215 can be slidably adjusted to extended positions or partially extended positions for supporting the work piece 530 (or another object). For example, the work piece 530 may be sawed (or drilled, for example) along axis 534 to form a second work piece 532. The axis may be perpendicular or approximately perpendicular to the cylindrically-shaped extensions of the support arms 210, 212, 213, 215. The gripping portions 315A, 317A of the support arms 213, 215 can be substantially a similar height as the tailgate 200 as measured between the surface 202 and the opposite-facing surface 203, such that the gripping portions 315A, 317A of the support arms 213, 215 substantially form a level surface with the surface 202 of the tailgate 200 for supporting the work piece 530 during manipulation. In addition, the gripping portion 317A of the support arm 215 may be substantially a similar height as the gripping portion 315A of the support arm 213, such that the gripping portion 317A of the support arm 215 and the gripping portion 315A of the support arm 213 form a substantially level surface for supporting the work piece 530 and the second work piece 532.

Figure 6:
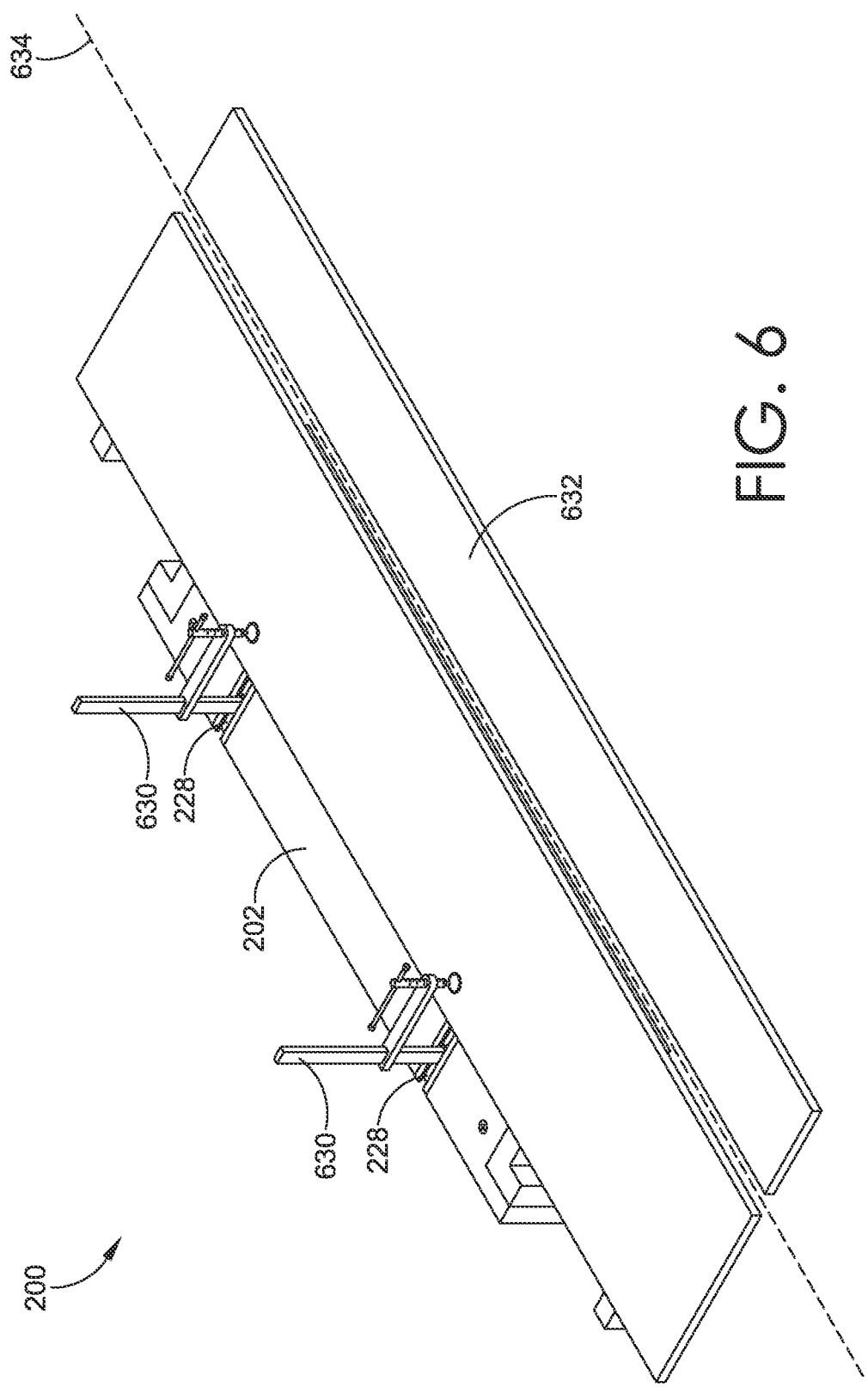
FIG. 6 again depicts the tailgate of FIGS. 2-3 with an integrated workbench structure, e.g., a pair of clamps positioned in a pair of tracks, used to support an object, in accordance with an embodiment of the present disclosure.

Looking now at FIG. 6, the tailgate 200 of FIGS. 2 and 3 is again shown, in accordance with an embodiment of the present disclosure. In particular, FIG. 6 shows the T-tracks 228 mounted on the tailgate 200, e.g., through insertion of fasteners into holes in the T-tracks 228 and through corresponding holes in the recesses for the T-tracks 228 formed in the tailgate 200. The depth of the recesses for the T-tracks 228 in the tailgate 200 is also substantially the height of the T-tracks 228 thereby providing a substantially co-planar surface across the tailgate 200. In different aspects, the T-track 228 can be formed of metal, metal alloy, composites, and/or polymer-based materials of sufficient rigidity to hold or brace other objects. In addition, FIG. 6 shows a pair of clamps 630 positioned in the T-tracks 228. The clamps 630 are configured to engage and adjustably slide along the T-tracks 228. In additional embodiments, one or more securing elements and/or stop-structures can be used for substantially securing the clamps 630 in position in the T-tracks 228. The clamps 630 can be used to hold a work piece 632 (or another object) against the surface 202 of the tailgate 200. In this braced position, the work piece 632 can then be manipulated, e.g., cut, drilled, assembled, or otherwise manipulated. In an example, work piece 632 may be secured by clamps 630 for sawing (or drilling, for example) along axis 634.

Figure 7:
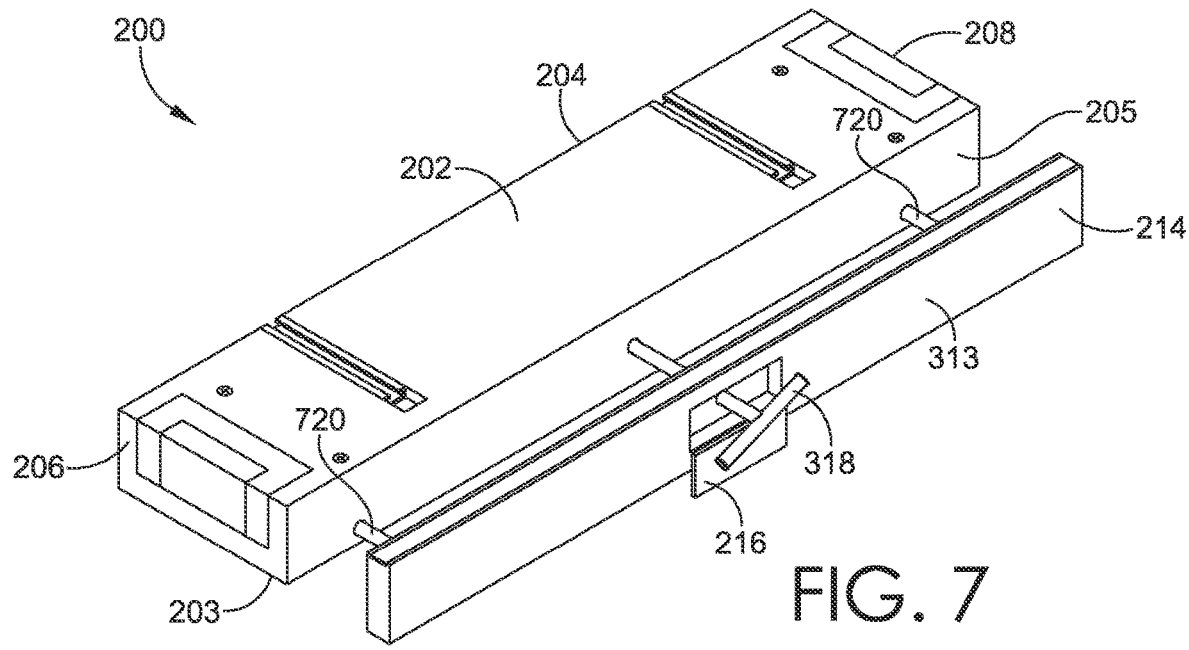
FIG. 7 again depicts the tailgate of FIGS. 2-3 with an integrated workbench structure, e.g., a vise, adjusted into one configuration, in accordance with an embodiment of the present disclosure.

Looking now at FIG. 7, the tailgate 200 of FIGS. 2 and 3 is again shown, in accordance with an embodiment of the present disclosure. In particular, the tailgate 200 is shown with the vise 214 adjusted into an expanded/displaced configuration. In addition, the pivot-lever 318 is extended. The pivot-lever 318, being extended through the clamping-element 313, has also been rotated to displace the clamping-element 313 from the distal end 205 of the tailgate 200. FIG. 7 also shows the cover 216 displaced so that the pivot-lever 318 can be extended out of the vise 214 to allow for rotation to increase or decrease the distance between the clamping-element 313 and the distal end 205. Upon finishing use of the vise 214, the pivot-lever 318 can be displaced (e.g., slid, depressed, or otherwise linearly translated) back into the passage for the pivot-lever 318 located within the tailgate 200. Then, the cover 216 can be closed to substantially enclose, cover, and/or obscure the pivot-lever 318 from the view.

To help stabilize the clamping-element 313, the clamping-element 313 is supported by the pivot-lever 318 and also by guide rails 720. The tailgate 200 can include holes that align with the guide rails 720 so that during translation of the clamping-element 313, the guide rails 720 can slide into or out of the holes in the tailgate 200. The clamping-element 313 can also include stop-structures that limit, inhibit, or substantially prevent the clamping-element 313 from detaching from the ends of the pivot-lever 318 and the guide rails 720.

Figure 8:
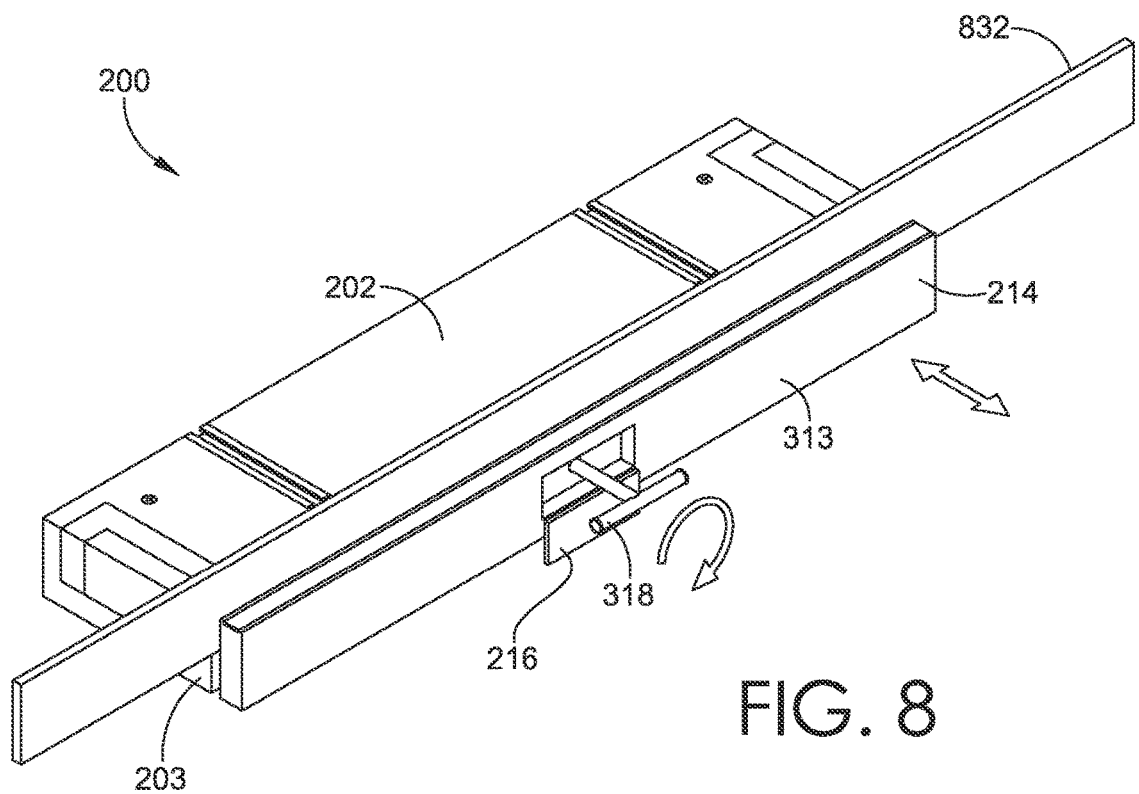
FIG. 8 depicts the tailgate shown in FIG. 7 with the vise adjusted into another configuration to brace an object, in accordance with an embodiment of the present disclosure.
Figure 9:
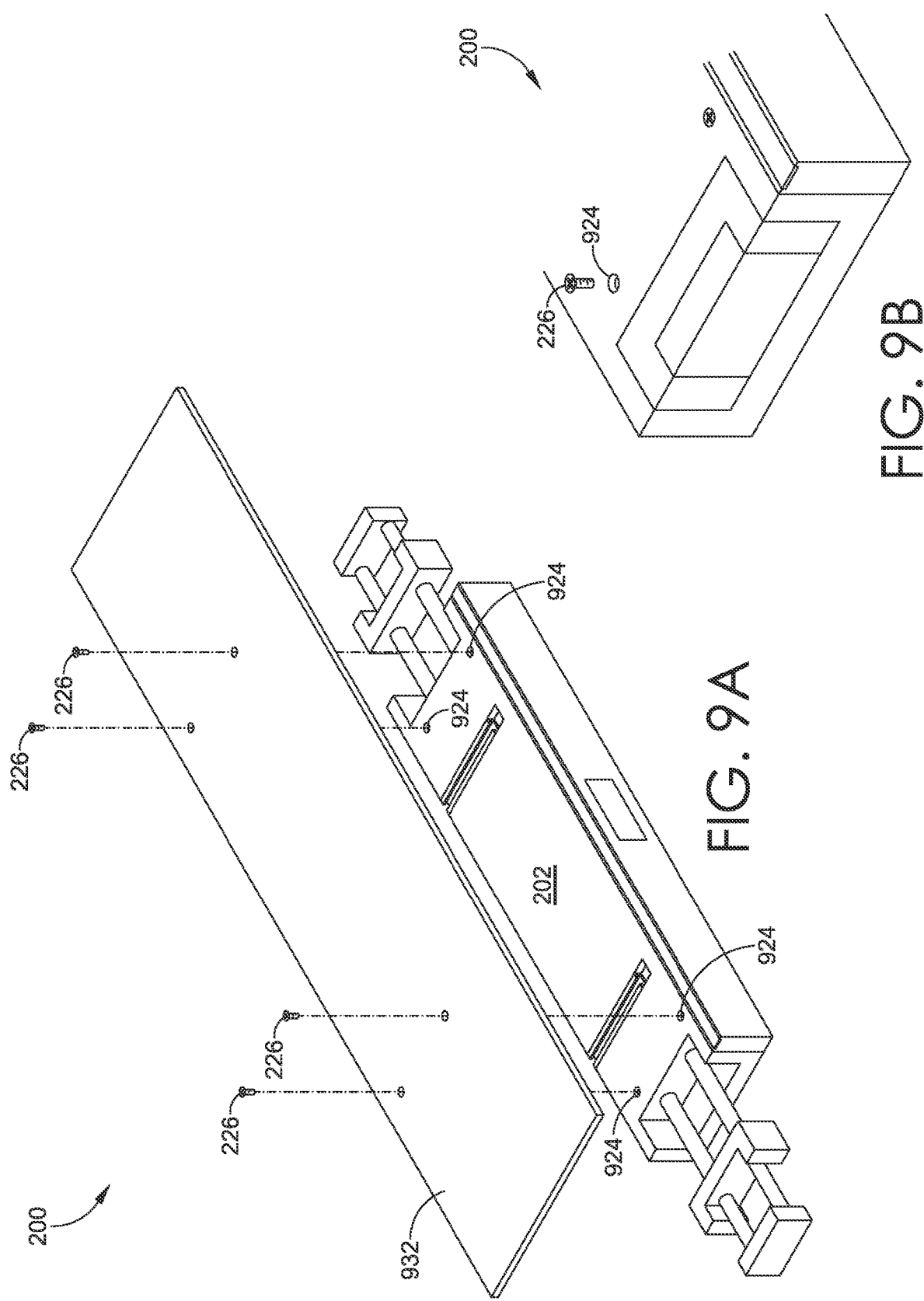
FIG. 9A depicts the tailgate of FIGS. 2-3 with a workbench structure, e.g., a plurality of mounting fasteners, in exploded form, in accordance with an embodiment of the present disclosure.
FIG. 9B depicts one end of the tailgate shown in FIG. 9A along with one of the mounting fasteners, in accordance with an embodiment of the present disclosure.

Looking at FIG. 8, the tailgate 200 is again shown, in accordance with an embodiment of the present disclosure. In FIG. 8, the clamping-element 313 is shifted toward the distal end 205 of the tailgate 200 and against a work piece 832 (e.g., a board in this instance). In particular, the pivot-lever 318 has been rotated to translate the clamping-element 313 toward the distal end 205 of the tailgate 200. This translates the clamping-element 313 and the guide rails 720 shown in FIG. 7, bracing the clamping-element 313 against the work piece 832. In addition to guiding the clamping-element 313, the pivot-lever 318 and the guide rails 720 can help support the object 832 positioned in the vise 214, as shown in FIG. 8. It should be noted that the pivot-lever 318 and guide rails 720 can be offset towards either surface 202, 203 to accommodate a large work piece in different circumstances.

Looking now at FIGS. 9A and 9B, the tailgate 200 of FIGS. 2 and 3 is again shown, in accordance with an embodiment of the present disclosure. FIG. 9A shows an exploded configuration. In particular, FIG. 9A depicts the tailgate 200 with the plurality of mounting fasteners 226 displaced from the plurality of mounting holes 924, and with a work piece 932 positioned therebetween. As noted above, the work piece 932 can be one that is manipulated or processed, or can simply be a sacrificial surface that is used to support other work pieces that are being manipulated. The work piece 932 can be secured against the surface 202 of the tailgate 200 by extending the plurality of mounting fasteners 226 through holes in the work piece 932 that are aligned with the plurality of mounting holes 924. The plurality of mounting fasteners 226 can then be adjusted to different depths in the mounting holes 924 to thereby brace the work piece 932. As discussed herein, the mounting fasteners 226 can be screws, bolts, nails, rivets, plugs, or other elongated objects that can be positioned in the plurality of mounting holes 924 with sufficient resistance that the mounting fasteners 226 can retain the work piece 932 against the tailgate 200 during manipulation. FIG. 9B generally shows the placement of a mounting fastener 226 in a mounting hole 924 as described herein.

Figure 10:
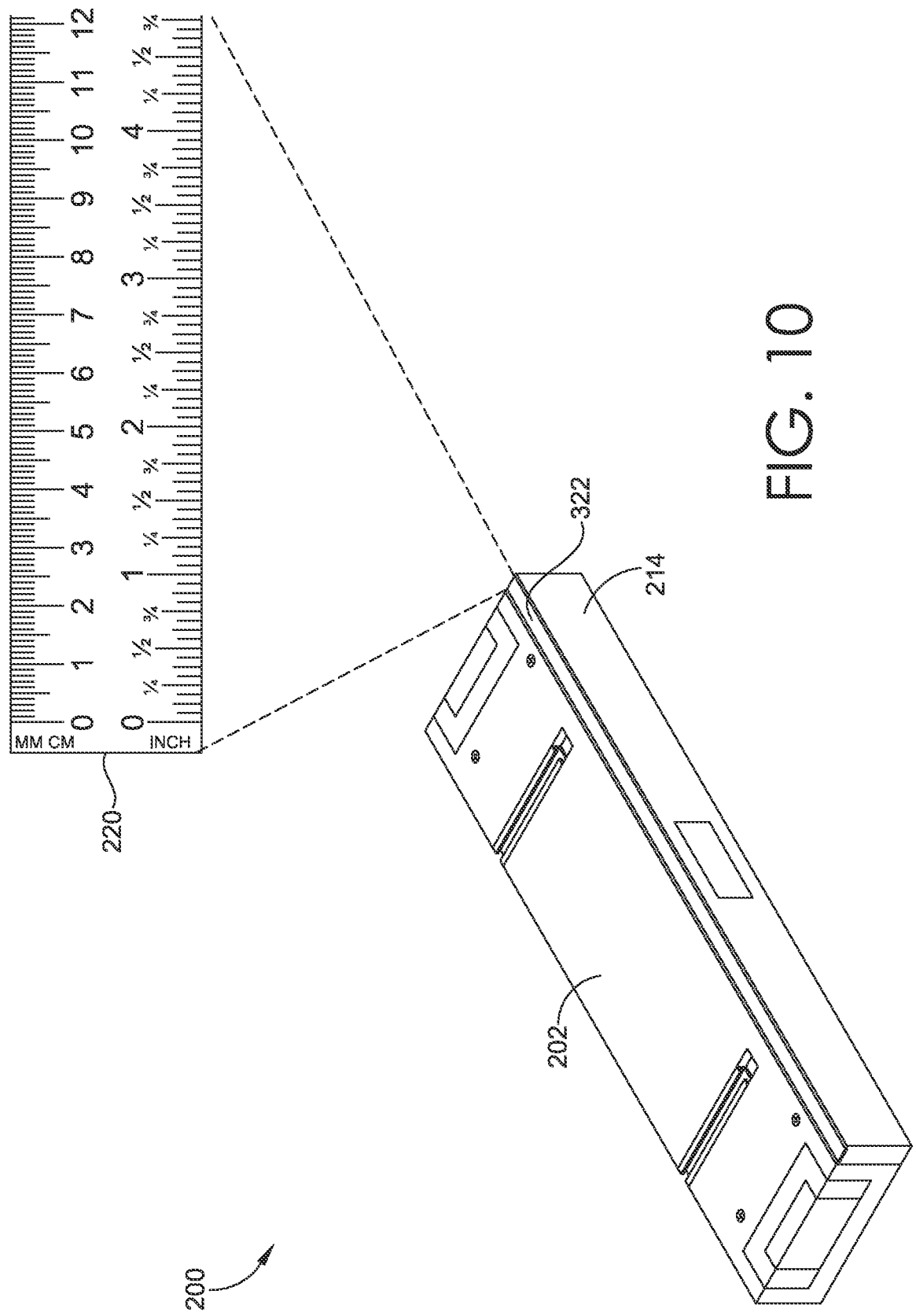
FIG. 10 depicts the tailgate of FIGS. 2-3 with a workbench structure, e.g., a ruler that fits at least partially into a recess, in accordance with an embodiment of the present disclosure.

Looking now at FIG. 10, the tailgate 200 of FIGS. 2 and 3 is again shown, in accordance with an embodiment of the present disclosure. In particular, FIG. 10 depicts the tailgate 200 with a measuring device (e.g., a ruler 220) that is removably positioned in a recess 322 on the tailgate 200. In the embodiment shown in FIG. 10, the recess 322 in particular is located on the vise 214. However, the recess 322 can also be located on the surface 202 of the tailgate 200 or at another location. The recess 322 is shaped to hold the ruler 220 and substantially maintain the ruler in this supported position, e.g., even during movement of the tailgate 200. This can be accomplished in different ways. For example, if the ruler is metal, magnets can be used to retain the ruler 220 in position in the recess 322. In other instances, the ruler 220 can be maintained in position through a friction or interference fit, or through use of securing features such as straps, covers, clips, or brackets, or other stop-elements that inhibit displacement of the ruler 220. With these configurations, manipulation of the securing features, or sufficient force applied to the ruler 220, can still remove the ruler 220 from the recess 322 for use.

Figure 11A:
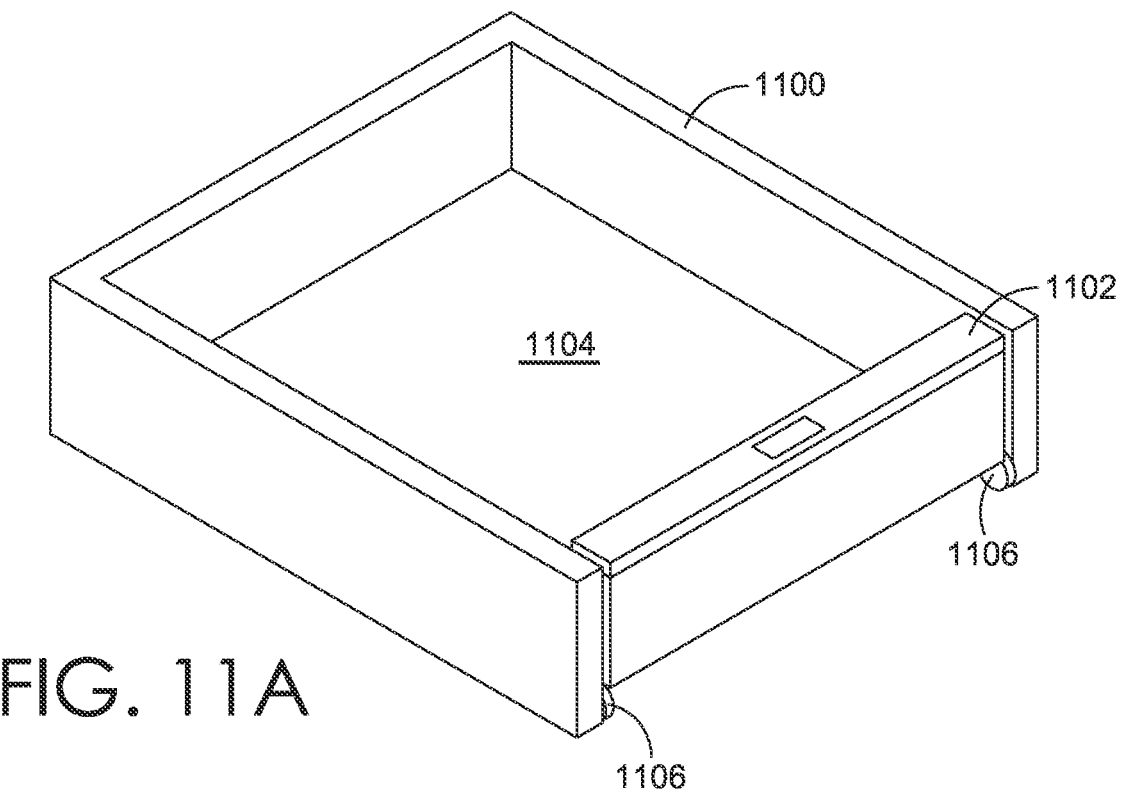
FIGS. 11A and 11B depict a vehicle cargo box with a tailgate, in accordance with an embodiment of the present disclosure.
Figure 11B:
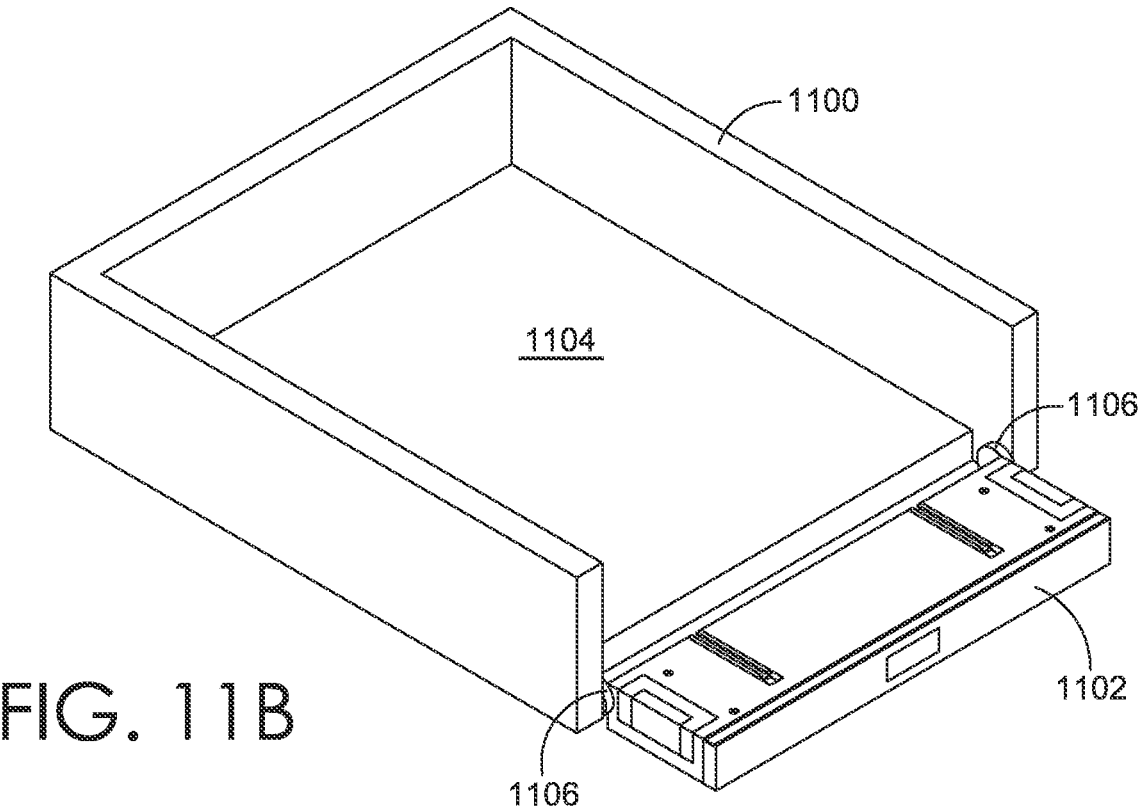

Looking now at FIGS. 11A and 11B, a cargo box 1100 that includes a tailgate 1102, e.g., one that is similar to the tailgate 200 shown in FIGS. 2 and 3, is provided, in accordance with an embodiment of the present disclosure.

The cargo box 1100 can be one that attaches to form part of a vehicle, e.g., a pickup truck or SUV, among others. FIG. 11A shows the cargo box 1100 with its tailgate 1102 in the substantially raised position. FIG. 11B shows the cargo box 1100 with its tailgate 1102 in the substantially lowered and supported position. The cargo box 1100 includes a base surface 1104. The base surface 1104 is arranged to be substantially co-planar with the tailgate 1102 when the tailgate 1102 is in the lowered position. The tailgate 1102 is connected to the cargo box 1100 with a pivot-connection 1106, e.g., which may be similar to the pivot-connection described in connection with FIG. 1. The pivot-connection 1106 may include, for example, a first tab or tabs attached to the tailgate 1102 that can be pivoted into contact with a second tab or tabs attached to the cargo box 1100. This contact can support the tailgate 1102 in an open position, e.g., with limited or no need for cables, arms, or struts extending between the tailgate 1102 and the cargo box 1100. In such configurations, the pivot-connection 1106 and tabs thereof can be configured to support at least 300 pounds (~136 kilograms).

Figure 12:
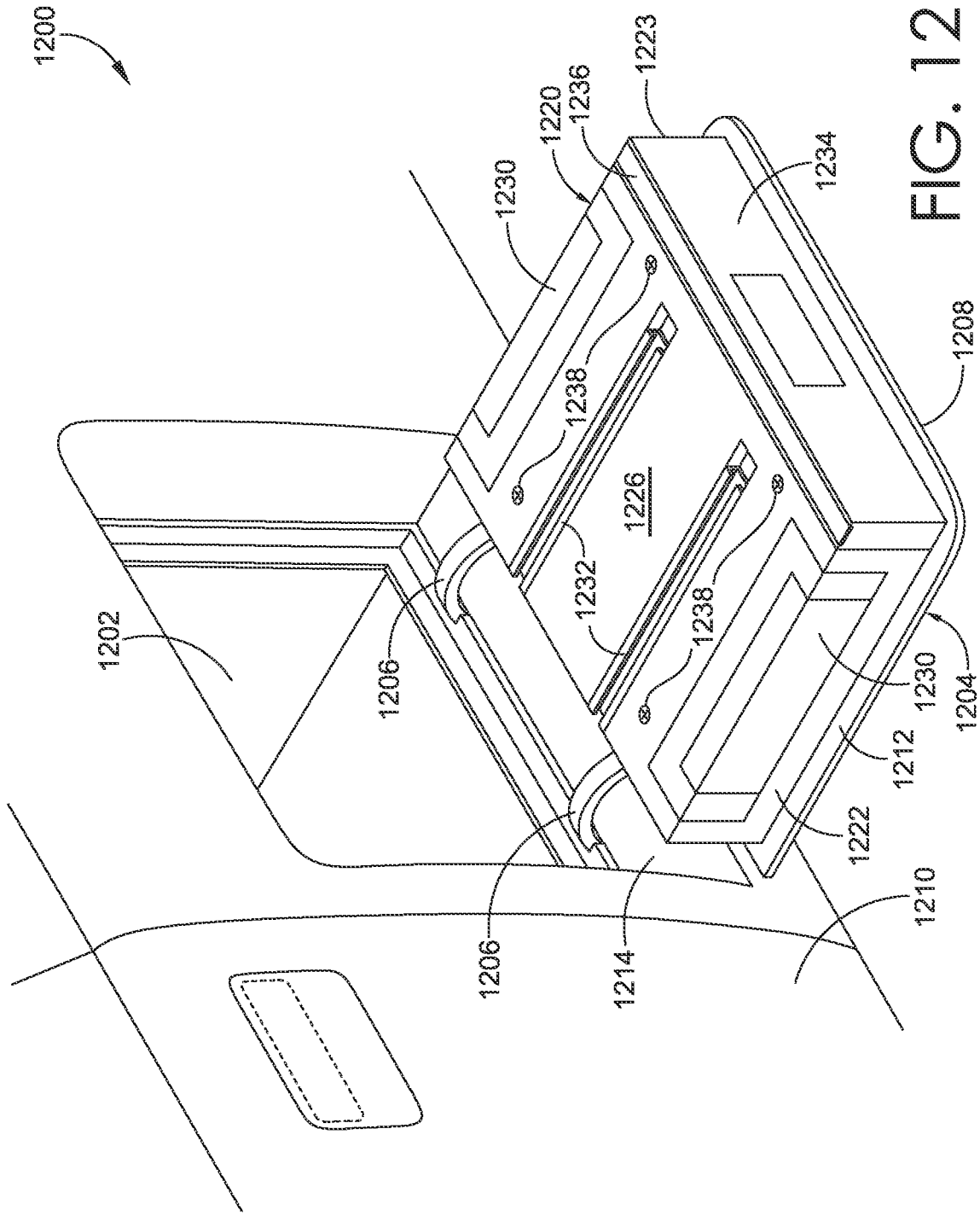
FIG. 12 depicts a gear-tunnel door for a vehicle that includes a selection of workbench structures, in accordance with an embodiment of the present disclosure.

Looking now at FIG. 12, a pivoting-structure 1200 for a vehicle is shown, in accordance with an embodiment of the present disclosure. In particular, the pivoting-structure 1200 shown in FIG. 12 includes a gear-tunnel door 1204 that provides access to a storage compartment 1202 that extends laterally across at least part of a width of an associated vehicle. In FIG. 12, the gear-tunnel door 1204 is in a generally open position. This position generally establishes a horizontal workbench accessible from a side of the vehicle. In different embodiments, the storage compartment 1202 aligned with the gear-tunnel door 1204 can extend part of the width of the vehicle, or substantially the entire width of the vehicle. The gear-tunnel door 1204 is illustrated as being on one side 1210 of the vehicle. However, in different embodiments, it can also be located on either or both sides of the vehicle.

The gear-tunnel door 1204 is mounted on a pivot-connection 1206. The gear-tunnel door 1204 can rotate about the pivot-connection 1206 between a raised position and a lowered position, the latter generally being shown in FIG. 12. In the lowered position, the gear-tunnel door 1204 is generally at a 90-degree angle from a vertical axis of the vehicle. As described herein, the pivot-connection 1206 can include a pair of tabs located on the gear-tunnel door 1204 (not shown in FIG. 12) that can be pivoted into contact with corresponding tabs (not shown in FIG. 12) mounted on an adjacent vehicle structure. This contact can support the gear-tunnel door 1204 in the open position, e.g., as shown in FIG. 12.

The gear-tunnel door 1204 shown in FIG. 12 includes a first end 1222, a second end 1223, and a surface 1226. The gear-tunnel door 1204 also includes an outer-door surface 1208 and an inner-door surface 1212. The gear-tunnel door 1204 also includes a body 1220 extending from the inner-door surface 1212, the body 1220 comprising workbench structures 1230, 1232, 1234, 1236, 1238 that are at least partially integrated into the body of the gear-tunnel door 1204, such as in tailgate 200 of FIGS. 2 and 3 for example. In particular, the gear-tunnel door 1204 includes workbench structures such as support arms 1230, T-tracks 1232, a vise 1234, a ruler 1236, and mounting fasteners 1238. It should be noted that additional or alternative workbench structures can be used with the gear-tunnel door 1204. The workbench structures 1230, 1232, 1234, 1236, 1238 can operate in a similar fashion as the corresponding structures on the tailgate 200 described in connection with FIGS. 2-10. For example, these structures can be similarly extendable and retractable, collapsible and expandable, or attachable and detachable, among other operabilities. The workbench structures 1230, 1232, 1234, 1236, 1238 on the gear-tunnel door 1204 can be configured to fit inside an entry 1214 to the storage compartment 1202 thereby allowing the gear-tunnel door 1204 to be in the closed, or raised, configuration.

Figure 13:
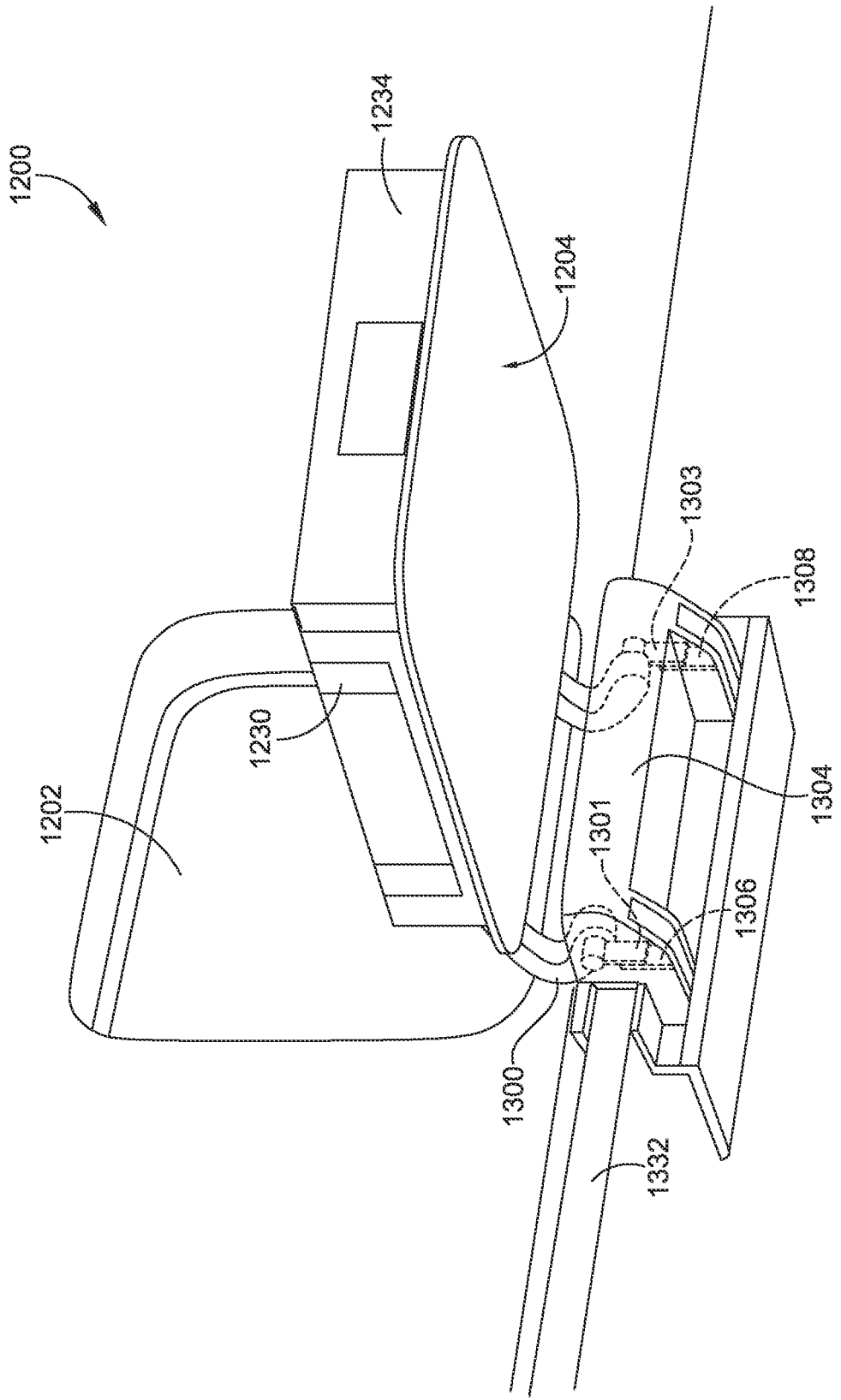
FIG. 13 depicts another perspective of the gear-tunnel door shown in FIG. 12, in accordance with an embodiment of the present disclosure.

Looking now at FIG. 13, the gear-tunnel door 1204 of FIG. 12 is generally shown with a pivot-connection 1300 more clearly depicted. The pivot-connection 1300 includes a pair of tabs 1301, 1303 that are generally attached to the gear-tunnel door 1204 such that the tabs 1301, 1303 are movable/pivotal with the gear-tunnel door 1204. With this configuration, the pair of tabs 1301, 1303 are pivotal into contact with a pair of tabs 1306, 1308 mounted to the vehicle or to a structure attached thereto. For example, the tabs 1306, 1308 may be attached to a chassis rail 1332 that structurally supports the vehicle. The tabs 1301, 1303, 1306, 1308 may be formed of rigid materials as described herein, e.g., being formed of materials and construction such that the contact of the tabs 1301, 1306 and 1303, 1308 can support at least 300 pounds (~136 kilograms). The tabs 1301, 1303, 1306, 1308 may be supported by a tab support member 1304.

Figure 14A:
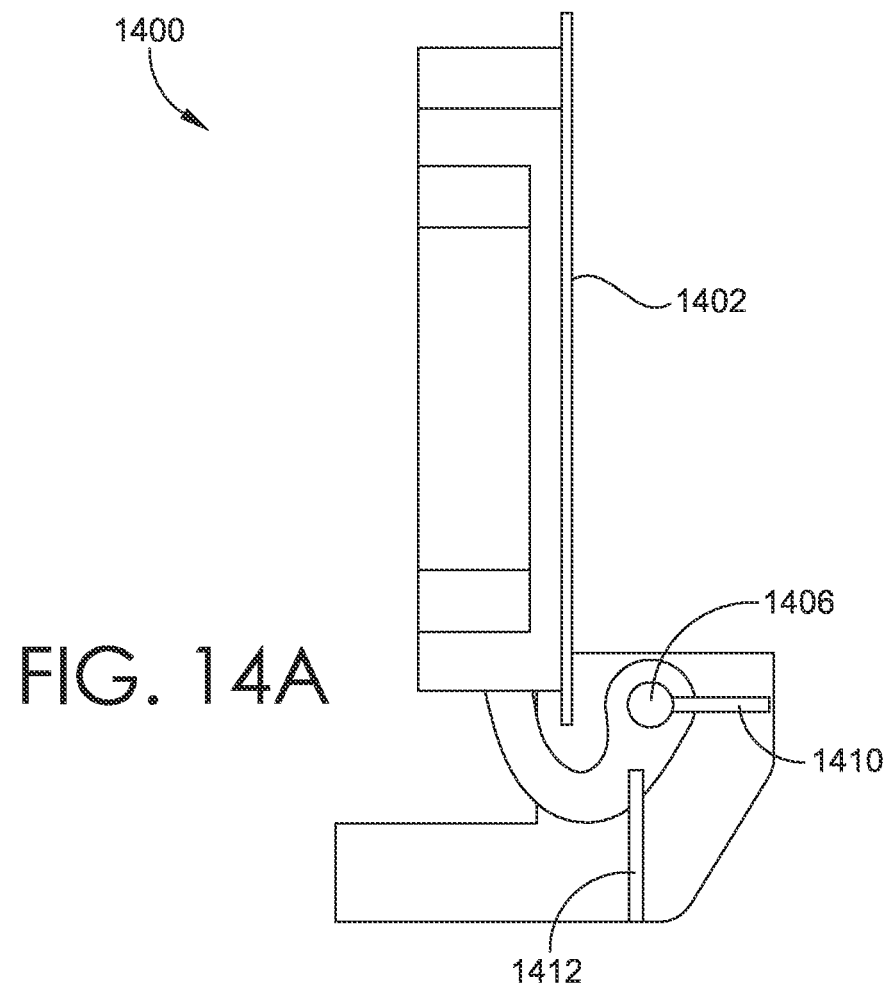
FIGS. 14A and 14B depict a configuration suitable for supporting a tailgate or another pivoting-structure in an open position, e.g., in one instance without the use of support cables, arms, and/or struts, in accordance with an embodiment of the present disclosure.
Figure 14B:
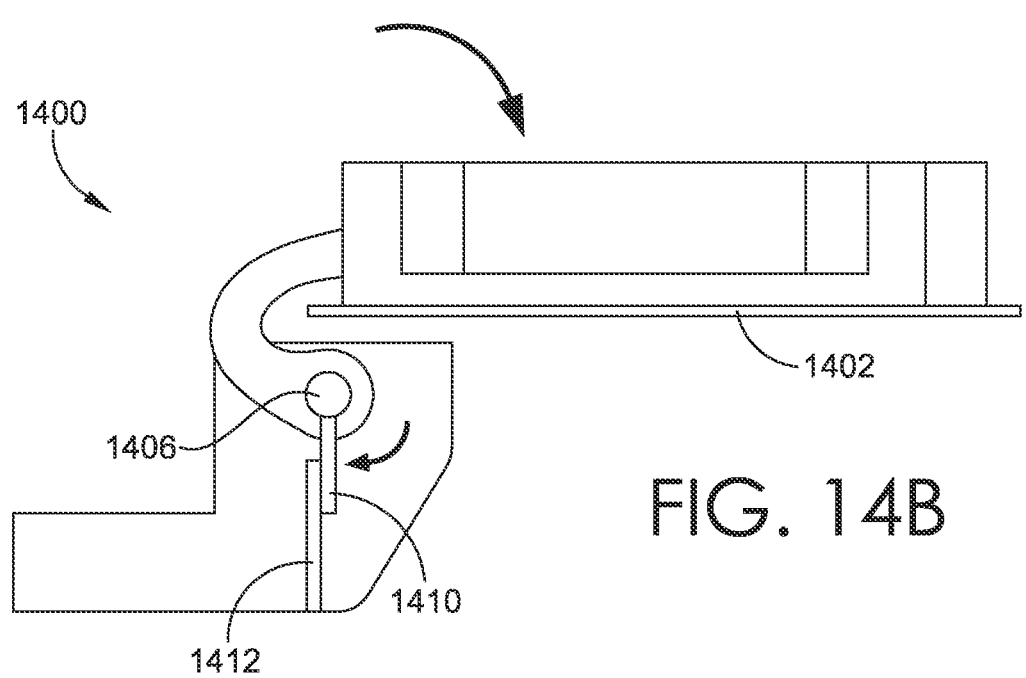

Looking now at FIGS. 14A and 14B, a cross-section of a pivot-assembly 1400, e.g., one that can be used with the tailgate 200 shown in FIGS. 2-10 or one that can be used with the gear-tunnel door 1204 shown in FIG. 12, is provided, in accordance with an embodiment of the present disclosure. In FIGS. 14A and 14B, the pivot-assembly 1400 includes a pivoting-structure 1402 mounted on a pivot-connection 1406. In different embodiments, the pivoting-structure 1402 can include any of the workbench structures described herein. The pivot-assembly 1400 also includes a pair of tabs, e.g., tab 1410 and tab 1412. The tab 1410 is attached to the pivoting-structure 1402. The tab 1412 is attached to an adjacent structure, e.g., part of the pivot-connection 1406, and/or part of an associated vehicle structure. With this configuration, the pivot-connection 1406 can be operated to rotate the tab 1410 into contact with the tab 1412. This contact can support the pivoting-structure 1402 in an open position, e.g., as generally shown in FIG. 14B. In one embodiment, the materials and construction of the pivot-connection 1406 and tabs 1410, 1412 thereof can support at least 300 pounds (~136 kilograms) of downward force on the pivoting-structure 1402 when it is in the open position, e.g., as generally shown in FIG. 14B. In different embodiments, the pivot-connection 1406 can be a hinged assembly or mechanism that includes different rotational components that are mated together to allow for rotational motion about a common axis. The pivot-connection 1406 can also include mechanical stops that limit rotation past a certain point.

Figure 15:
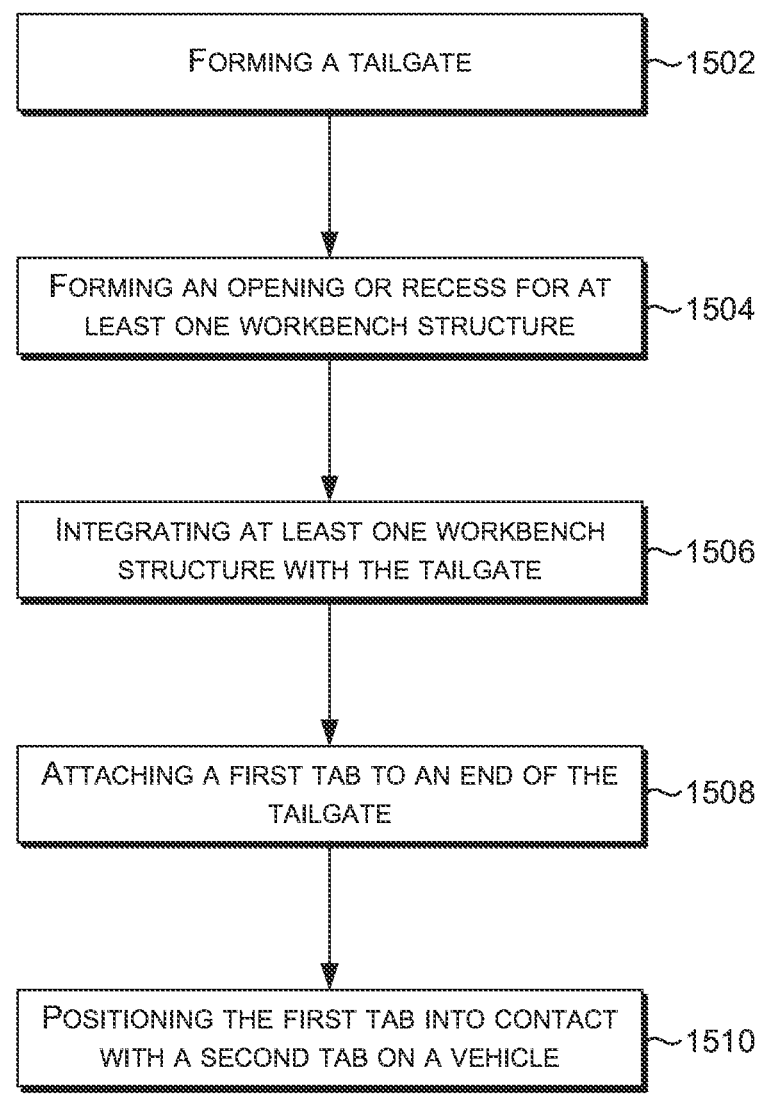
FIG. 15 depicts a block diagram of an example method of manufacturing a tailgate with at least one workbench structure, in accordance with an embodiment of the present disclosure.

Looking now at FIG. 15, a block diagram of an example method 1500 of manufacturing a tailgate (e.g., such as the tailgate 200 shown in FIGS. 2 and 3) with at least one workbench structure (e.g., any of the workbench structures shown in FIGS. 2-10) is provided, in accordance with an embodiment of the present disclosure. The method 1500 includes blocks 1502-1510, but is not limited or restricted to this selection of elements. In block 1502, a tailgate, e.g., such as the tailgate 200 shown in FIGS. 2 and 3, is formed. In block 1504, at least one opening or recess is formed within the tailgate for at least one workbench structure, e.g., such as the support arms 210, 212 shown in FIG. 3, or other workbench structures discussed in connection with FIGS. 2-10 herein. In block 1506, the workbench structure is integrated with the tailgate, e.g., through being connected, secured, or operably attached thereto. For example, in one instance, a support arm may be slidably mounted in a recess, such that the support arm is adjustable between a retracted position and an extended position within the recess. In block 1508, a first tab, e.g., such as the tab 1410 shown in FIG. 14A, is attached to an end of the tailgate, e.g., such as the end 206 shown in FIG. 2. In block 1510, the first tab is positioned in contact with a second tab, e.g., such as the tab 1412, located on a vehicle or other associated structure that remains in fixed position relative to the first tab that is movable.

Embodiment 1. A tailgate for a vehicle, comprising: a first tab on the tailgate that can be pivoted into contact with a second tab on the vehicle, wherein the contact supports the tailgate in an open position; and at least one workbench structure that is at least partially integrated with the tailgate and that is adjustable into different configurations.

Embodiment 2. The tailgate of embodiment 1, wherein, when in contact, the first tab and the second tab support at least 300 pounds.

Embodiment 3. The tailgate of embodiments 1-2, wherein the at least one workbench structure comprises: a first support arm; and a first recess formed in the tailgate, the first support arm slidably mounted in the first recess, such that the first support arm is adjustable between a retracted position and an extended position in the first recess.

Embodiment 4. The tailgate of embodiments 1-3, wherein the at least one workbench structure further comprises: a second support arm; and a second recess formed in the first support arm, the second support arm slidably mounted in the second recess, such that the second support arm is adjustable between a retracted position and an extended position in the second recess, wherein the first support arm and the second support arm extend and retract along a common axis.

Embodiment 5. The tailgate of embodiments 1-4, wherein the at least one workbench structure comprises a vise coupled to the tailgate, wherein the vise is adjustable between a closed configuration and an open configuration.

Embodiment 6. The tailgate of embodiments 1-5, wherein the vise comprises: a clamping-element; and a pivot-lever that extends through an opening in the clamping-element and into contact with the tailgate, wherein rotation of the pivot-lever adjusts a distance between the clamping-element and the tailgate.

Embodiment 7. The tailgate of embodiments 1-6, wherein the pivot-lever is extendable and retractable.

Embodiment 8. The tailgate of embodiments 1-7, further comprising a lid coupled to the clamping-element, the lid adjustable between an open configuration and a closed configuration, wherein, in the closed configuration, the lid covers the pivot-lever in its retracted position.

Embodiment 9. The tailgate of embodiments 1-8, wherein the at least one workbench structure comprises: a ruler; and a recess in the tailgate that is shaped to hold the ruler.

Embodiment 10. The tailgate of embodiments 1-9, wherein the at least one workbench structure comprises: a pair of T-tracks positioned on a surface of the tailgate; and a pair of clamps configured to engage and slide along the pair of T-tracks.

Embodiment 11. The tailgate of embodiments 1-10, wherein the at least one workbench structure comprises: a plurality of mounting holes in the tailgate; and a plurality of mounting fasteners each securable in one of the plurality of mounting holes and adjustable to different depths therein.

Embodiment 12. An assembly for a vehicle, comprising: a tailgate, comprising: a first tab on the tailgate that can be pivoted into contact with a second tab on the vehicle, wherein the contact supports the tailgate in an open position, and at least one workbench structure that is at least partially integrated with the tailgate and that is adjustable into different configurations; and a cargo box, wherein the tailgate and the cargo box are attachable at a pivot-connection.

Embodiment 13. The assembly of embodiment 12, wherein, when in contact, the first tab and the second tab support at least 300 pounds.

Embodiment 14. The assembly of embodiments 12-13, wherein the at least one workbench structure comprises: a first support arm; and a first recess formed in the tailgate, the first support arm slidably mounted in the first recess, such that the first support arm is adjustable between a retracted position and an extended position in the first recess.

Embodiment 15. The assembly of embodiments 12-14, wherein the at least one workbench structure further comprises: a second support arm; and a second recess formed in the first support arm, the second support arm slidably mounted in the second recess, such that the second support arm is adjustable between a retracted position and an extended position in the second recess, wherein the first support arm and the second support arm extend and retract along a common axis.

Embodiment 16. The assembly of embodiments 12-15, wherein the at least one workbench structure comprises a vise that is coupled to the tailgate, and wherein the vise is adjustable between a closed configuration and an open configuration.

Embodiment 17. The assembly of embodiments 12-16, wherein the at least one workbench structure comprises: a ruler, and a recess in the tailgate that is shaped to hold the ruler.

Embodiment 18. The assembly of embodiments 12-17, wherein the at least one workbench structure comprises: a pair of T-tracks located on a surface of the tailgate; and a pair of clamps configured to engage and slide along the pair of T-tracks.

Embodiment 19. The assembly of embodiments 12-18, wherein the at least one workbench structure comprises: a plurality of mounting holes in the tailgate; and a plurality of mounting fasteners each securable in one of the plurality of mounting holes and adjustable to different depths therein.

Embodiment 20. A vehicle, comprising: a frame; a cargo box coupled to the frame; and a tailgate coupled to the cargo box at a pivot-connection, the tailgate comprising: a first tab on the tailgate that can be pivoted into contact with a second tab coupled to the frame, wherein the contact supports the tailgate in an open position, and at least one workbench structure that is at least partially integrated with the tailgate and that is adjustable into different configurations.

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure. For example, the fluid lines or fittings described can be configured for use in various other components including, but not limited to, plumbing systems or other piping systems. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A tailgate for a vehicle, comprising:
   a first tab on the tailgate that can be pivoted into contact with a second tab on the vehicle, wherein the contact supports the tailgate in an open position; and
   at least one workbench structure that is at least partially integrated with the tailgate and that is adjustable into different configurations, the at least one workbench structure comprising a vise coupled to the tailgate, the vise comprising a clamping-element and a pivot-lever that extends through an opening in the clamping-element and into contact with the tailgate, the pivot-lever having a retracted position and an extended position; and
   a lid, coupled to the clamping-element, the lid having an open configuration and a closed configuration,
   wherein, when the lid is in the closed configuration and the pivot-lever is in the retracted position, the lid covers the pivot-lever.

2. The tailgate of claim 1, wherein, when in contact, the first tab and the second tab support at least 300 pounds.

3. The tailgate of claim 1, wherein the at least one workbench structure comprises:
   a first support arm; and
   a first recess formed in the tailgate, the first support arm slidably mounted in the first recess, such that the first support arm is adjustable between a retracted position and an extended position in the first recess.

4. The tailgate of claim 3, wherein the at least one workbench structure further comprises:
   a second support arm; and
   a second recess formed in the first support arm, the second support arm slidably mounted in the second recess, such that the second support arm is adjustable between a retracted position and an extended position in the second recess, wherein the first support arm and the second support arm extend and retract along a common axis.

5. The tailgate of claim 1, wherein the vise is adjustable between a closed configuration and an open configuration.

6. The tailgate of claim 5, wherein rotation of the pivot-lever adjusts a distance between the clamping-element and the tailgate.

7. The tailgate of claim 1, wherein the at least one workbench structure comprises:
   a ruler; and
   a recess in the tailgate that is shaped to hold the ruler.

8. The tailgate of claim 1, wherein the at least one workbench structure comprises:
   a pair of T-tracks positioned on a surface of the tailgate; and
   a pair of clamps configured to engage and slide along the pair of T-tracks.

9. The tailgate of claim 1, wherein the at least one workbench structure comprises:
   a plurality of mounting holes in the tailgate; and
   a plurality of mounting fasteners each securable m one of the plurality of mounting holes and adjustable to different depths therein.

10. An assembly for a vehicle, comprising:
    a tailgate, comprising:
       a first tab on the tailgate that is configured to be pivoted into contact with a second tab on the vehicle, wherein the first tab comprises a first flat surface, the second tab comprises a second flat surface that extends perpendicularly from the vehicle, and the contact between the first flat surface and the second flat surface supports the tailgate in an open position, and
       at least one workbench structure that is at least partially integrated with the tailgate and that is adjustable into different configurations, the at least one workbench structure comprising a vise coupled to the tailgate, the vise comprising a clamping-element and a pivot-lever having a retracted position and an extended position, and
       a lid, coupled to the clamping-element, the lid having an open configuration and a closed configuration; and
    a cargo box,
    wherein the tailgate and the cargo box are attachable at a pivot-connection, and
    wherein, when the lid is in the closed configuration and the pivot-lever is in the retracted position, the lid covers the pivot-lever.

11. The assembly of claim 10, wherein, when in contact, the first tab and the second tab support at least 300 pounds.

12. The assembly of claim 10, wherein the at least one workbench structure comprises:
    a first support arm; and
    a first recess formed in the tailgate, the first support arm slidably mounted in the first recess, such that the first support arm is adjustable between a retracted position and an extended position in the first recess.

13. The assembly of claim 12, wherein the at least one workbench structure further comprises:
    a second support arm; and
    a second recess formed in the first support arm, the second support arm slidably mounted in the second recess, such that the second support arm is adjustable between a retracted position and an extended position in the second recess, wherein the first support arm and the second support arm extend and retract along a common axis.

14. The assembly of claim 10, wherein the vise is adjustable between a closed configuration and an open configuration.

15. The assembly of claim 10, wherein the at least one workbench structure comprises:
    a ruler, and
    a recess in the tailgate that is shaped to hold the ruler.

16. The assembly of claim 10, wherein the at least one workbench structure comprises:
    a pair of T-tracks located on a surface of the tailgate; and
    a pair of clamps configured to engage and slide along the pair of T-tracks.

17. The assembly of claim 10, wherein the at least one workbench structure comprises:
    a plurality of mounting holes in the tailgate; and
    a plurality of mounting fasteners each securable in one of the plurality of mounting holes and adjustable to different depths therein.

18. A vehicle, comprising:
    a frame;
    a cargo box coupled to the frame; and
    a tailgate coupled to the cargo box at a pivot-connection, the tailgate comprising:
       a first tab on the tailgate that is configured to be pivoted into contact with a second tab on the vehicle, wherein the first tab comprises a first flat surface, the second tab comprises a second flat surface that extends perpendicularly from the vehicle, and the contact between the first flat surface and the second flat surface supports the tailgate in an open position, and
       at least one workbench structure that is at least partially integrated with the tailgate and that is adjustable into different configurations, the at least one workbench structure comprising a vise coupled to the tailgate, the vise comprising a clamping-element and a pivot-lever having a retracted position and an extended position, and
       a lid, coupled to the clamping-element, the lid having an open configuration and a closed configuration,
    wherein, when the lid is in the closed configuration and the pivot-lever is in the retracted position, the lid covers the pivot-lever.

* * * * *